US008405848B2

(12) United States Patent

Yamaguchi et al.

(10) Patent No.: US 8,405,848 B2

(45) Date of Patent: Mar. 26, 2013

(54) PRINT SYSTEM

(75) Inventors: Takehito Yamaguchi, Osaka (JP); Akihiro Tamura, Osaka (JP); Masayuki Yoneyama, Osaka (JP)

(73) Assignee: Panasonic Corporation, Osaka (JP)

( * ) Notice: Subject to any disclaimer, the term of this patent is extended or adjusted under 35 U.S.C. 154(b) by 1167 days.

(21) Appl. No.: 11/791,867

(22) PCT Filed: Nov. 16, 2005

(86) PCT No.: PCT/JP2005/021037

§ 371 (c)(1), (2), (4) Date: Apr. 21, 2008

(87) PCT Pub. No.: WO2006/059481

PCT Pub. Date: Jun. 8, 2006

(65) Prior Publication Data

US 2009/0021777 A1 Jan. 22, 2009

(30) Foreign Application Priority Data

Nov. 30, 2004 (JP) ................................ 2004-346466
Aug. 25, 2005 (JP) ................................ 2005-244347

(51) Int. Cl.
*G06F 3/12* (2006.01)
*G06K 15/00* (2006.01)
*G06Q 30/00* (2012.01)

(52) U.S. Cl. ... 358/1.15; 358/1.11; 705/408; 705/26.35; 705/26.81

(58) Field of Classification Search ........................ None
See application file for complete search history.

(56) References Cited

U.S. PATENT DOCUMENTS

| | | | | |
|---|---|---|---|---|
| 6,628,417 | B1 * | 9/2003 | Naito et al. | 358/1.15 |
| 7,124,094 | B1 * | 10/2006 | Kobayashi et al. | 705/64 |
| 7,345,780 | B2 * | 3/2008 | Seto | 358/1.15 |
| 2002/0165833 | A1 * | 11/2002 | Minowa et al. | 705/400 |
| 2003/0020951 | A1 * | 1/2003 | Minowa et al. | 358/1.15 |

(Continued)

FOREIGN PATENT DOCUMENTS

| | | |
|---|---|---|
| JP | 2000-171911 | 6/2000 |
| JP | 2000-261578 | 9/2000 |

(Continued)

OTHER PUBLICATIONS

International Search Report issued Feb. 7, 2006 in International (PCT) Application No. PCT/JP2005/021037.

*Primary Examiner* — Satwant Singh

(74) *Attorney, Agent, or Firm* — Wenderoth, Lind & Ponack, L.L.P.

(57) ABSTRACT

A print system includes a digital camera serving as an information device for storing image data, order reception servers adapted for accepting a print order from a digital camera and connected to the digital camera over a network, and a registration center server for managing the information in an order reception server which can accept a print order from the digital camera. When the digital camera sets up communication with the order reception server, the digital camera inquires the URL of the order reception server of the registration center server over the network. The registration center server sends the URL of the order reception server which can accept a print order from the digital camera to the digital camera. The digital camera sets up communication with the order reception server of the URL acquired from the registration center server.

4 Claims, 49 Drawing Sheets

U.S. PATENT DOCUMENTS

| | | | | |
|---|---|---|---|---|
| 2003/0063304 | A1* | 4/2003 | Satomi et al. | 358/1.11 |
| 2003/0065807 | A1* | 4/2003 | Satomi et al. | 709/231 |
| 2003/0110170 | A1* | 6/2003 | Matsuoka | 707/9 |
| 2003/0179405 | A1 | 9/2003 | Seto | |
| 2004/0041923 | A1 | 3/2004 | Iida | |
| 2004/0133612 | A1 | 7/2004 | Satomi | |
| 2005/0196213 | A1* | 9/2005 | Ashizaki | 400/61 |
| 2006/0129465 | A1* | 6/2006 | Sailus et al. | 705/26 |

FOREIGN PATENT DOCUMENTS

| | | |
|---|---|---|
| JP | 2002-111926 | 4/2002 |
| JP | 2002-251548 | 9/2002 |
| JP | 2002-351765 | 12/2002 |
| JP | 2003-169076 | 6/2003 |
| JP | 2003-316981 | 11/2003 |
| JP | 2004-213356 | 7/2004 |

* cited by examiner

*Fig. 4*

221 COSTOMER LIST

| CAMERA MANUFACTURER | DEVICE ID | MAC ADDRESS | PASSWORD | CREDIT NUMBER | DELIVERY DESTINATION 1 (CODE) | DELIVERY DESTINATION 1 (ADDRESS) | DELIVERY DESTINATION 3 (CODE) | DELIVERY DESTINATION 3 (ADDRESS) | RETURN ADDRESS 1 (E-MAIL) | RETURN ADDRESS 2 (PHONE) | |
|---|---|---|---|---|---|---|---|---|---|---|---|
| COMPANY A | A8901 | 012345 | 4471 | 0987-6543-2109 | 0000 | ... HIRAKATA-SHI, OSAKA | 0001 | ... HUKUYAMA-SHI, HIROSHIMA | NOT REGISTERED | 06-6666-1234 | |
| COMPANY B | B3456 | 234567 | NOT REGISTERED | NOT REGISTERED | NOT REGISTERED | NOT REGISTERED | NOT REGISTERED | NOT REGISTERED | NOT REGISTERED | NOT REGISTERED | |
| COMPANY B | B3457 | 234568 | NOT REGISTERED | NOT REGISTERED | NOT REGISTERED | NOT REGISTERED | NOT REGISTERED | NOT REGISTERED | NOT REGISTERED | NOT REGISTERED | |
| | | | | | | | | | | | |

*Fig. 5*

223 PROGRESS LIST

| ORDER NUMBER | ORDER DATE / TIME | CANCEL DATE / TIME | PRINT DATE / TIME | DELIVERY CENTER | DELIVERY DATE / TIME | CURRENT STATUS | DELIVERY SCHEDULE |
|---|---|---|---|---|---|---|---|
| 0411 | 041115 13:00 | | 041116 9:10 | | | PRINTED | 041117 17:00 |
| 0412 | 041115 13:05 | | | | | ACCEPTED | 041117 17:00 |
| | | | | | | | |

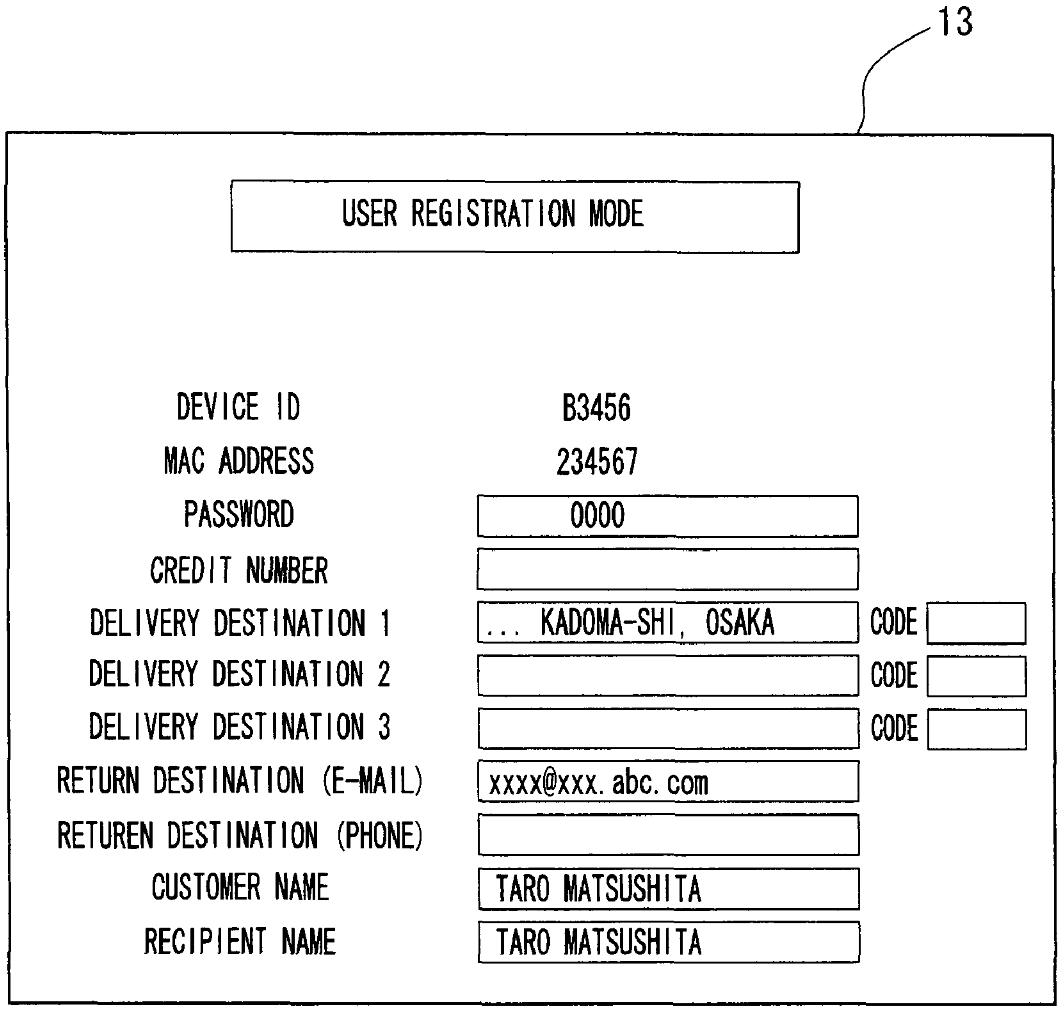

Fig. 8

```
┌─────────────────────────────────────────────────────────────┐
│                                                          ─13│
│      ┌─────────────────────────────────────────────┐        │
│      │                                             │        │
│      │         ┌──────────────────────────┐        │        │
│      │         │    USER REGISTRATION MODE │        │        │
│      │         └──────────────────────────┘        │        │
│      │                                             │        │
│      │     DEVICE ID            B3456              │        │
│      │     MAC ADDRESS          234567             │        │
│      │     PASSWORD          [  0000  ]            │        │
│      │     CREDIT NUMBER     [        ]            │        │
│      │     DELIVERY DESTINATION 1  [... KADOMA-SHI, OSAKA] CODE [ ] │
│      │     DELIVERY DESTINATION 2  [              ] CODE [ ] │
│      │     DELIVERY DESTINATION 3  [              ] CODE [ ] │
│      │     RETURN DESTINATION (E-MAIL) [xxxx@xxx.abc.com]   │
│      │     RETUREN DESTINATION (PHONE) [             ]      │
│      │     CUSTOMER NAME     [ TARO MATSUSHITA ]           │
│      │     RECIPIENT NAME    [ TARO MATSUSHITA ]           │
│      │                                             │        │
│      └─────────────────────────────────────────────┘        │
└─────────────────────────────────────────────────────────────┘
```

(ESTIMATION REQUEST MAIL)

Date:Wed, 17 Nov 2004 16:59:07+0900

A ～ From:234567@***.jp

B ～ To:printservice@panacolor.ne.jp

Subject:Pana DSC Picture estimate, B3456-234567-3210
⎯⎯⎯⎯ ⎯⎯⎯⎯⎯⎯ ⎯⎯⎯⎯⎯⎯⎯ ⎯⎯⎯⎯⎯⎯
C1　　　C2　　　C3　　　C4

D ～ MIME-version:1.0

Content-type:application/octet-stream;name=AUTPRINT.MRK
　　　　　　　　　⎯ E
Content-transfer-encoding:base64

F ～ X-mailer:PanaDSC

Content-disposition:attachment;filename=AUTPRINT.MRK
　　　　　⎯
　　　　　G

Fig.17

(ESTIMATION RETURN MAIL)

Date:Wed, 17 Nov 2004 16:59:07+0900

A ~ From:printservice@panacolor.ne.jp

B ~ To:From:234567@***.jp

Subject:estimate OK-45-2250-3210-041117-L:2M
                C1  C2  C3   C4    C5   C6

D ~ MIME-version:1.0

Content-type:text/plain;charset=ISO-2022-JP
                        E

Content-transfer-encoding:7bit

F ~ X-mailer:PanaDSC

*Fig. 20A*
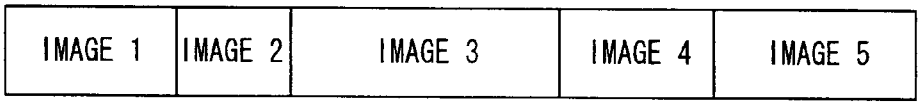
*Fig. 20B*
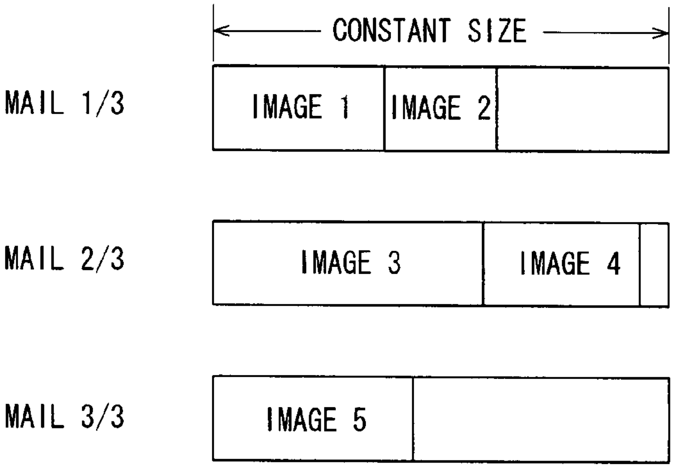
*Fig. 21*
ORDER MAIL (WITH DPOF APPENDED)
Date:Wed, 17 Nov 2004 16:59:07+0900
From:234567@***.jp
To:printservice@panacolor.ne.jp
Subject:Pana DSC Picture order B3456-234567-3210 (order: C1; B3456: C2; 234567: C3; 3210: C4)
MIME-version:1.0
Content-type:application/octet-stream;name=AUTPRINT.MRK (E)
Content-transfer-encoding:base64
X-mailer:PanaDSC
Content-disposition:attachment;filename=AUTPRINT.MRK

*Fig.22*

ORDER MAIL (WITH IMAGES APPENDED)

Date:Wed, 17 Nov 2004 16:59:07+0900

From:234567@***.jp

To:printservice@panacolor.ne.jp

Subject:Pana DSC Picture image B3456-234567-1/3

C1 C2 C3 C4

MIME-version:1.0

Content-type:image/jpeg;name=P1000031.JPG

E

Content-transfer-encoding:base64

X-mailer:PanaDSC

Content-disposition:attachment;filename=P1000031.JPG

IMAGE DISTRIBUTION MODE

PLEASE SELECT ORDER NUMBER FOR IMAGES TO BE DISTRIBUTED.

| | ORDER NUMBER | PRINT SIZE | NUMBER OF PRINTS | ORDER DATE / TIME |
|---|---|---|---|---|
| ● | 4711 | L | 45 | 041115 13:00 |
| ○ | 4685 | SERVICE | 3 | 041112 18:15 |
| ○ | 4634 | L | 21 | 041109 19:42 |

PLEASE ENTER DISTRIBUTION DESTINATION.

*Fig.29*

(IMAGE DISRIBUTION MAIL)

Date:Wed, 17 Nov 2004 16:59:07+0900

From:234567@***.jp

To:******** B

Subject: IMAGE DISRIBUTION (No. 1) C

MIME-version:1.0

Content-type:image/jpeg;name=P1000031.JPG

Content-transfer-encoding:base64

X-mailer:PanaDSC

Content-disposition:attachment;filename=P1000031.JPG

REPRINT ORDER MODE

PLEASE SELECT ORDER NUMBER FOR IMAGES TO BE REPRINTED.

| | ORDER NUMBER | PRINT SIZE | NUMBER OF PRINTS | ORDER DATE / TIME |
|---|---|---|---|---|
| ● | 4711 | L | 45 | 041115 13:00 |
| ○ | 4685 | SERVICE | 3 | 041112 18:15 |
| ○ | 4634 | L | 21 | 041109 19:42 |

PLEASE ENTER NUMBER OF REPRINTS.

*Fig.32*

(REPRINT ORDER MAIL)

Date:Wed, 17 Nov 2004 16:59:07+0900

A ~ From:234567@***.jp

B ~ To:printservice@panacolor.ne.jp

Subject:Pana DSC Picture reprint 0411-1

(reprint: C1; 0411: C2; 1: C3)

D ~ MIME-version:1.0

Content-type:text/plain;charset=ISO-2002-JP (plain: E)

Content-transfer-encoding:7bit

F ~ X-mailer:PanaDSC

*Fig.33*

(REORDER MAIL)

Date:Wed, 17 Nov 2004 16:59:07+0900

A ~ From:234567@***.jp

B ~ To:printservice@panacolor.ne.jp

Subject:Pana DSC Picture reorder (C1) 0411 (C2)

D ~ MIME-version:1.0

Content-type:text/plain;charset=ISO-2002-JP (E)

Content-transfer-encoding:7bit

F ~ X-mailer:PanaDSC

*Fig.34*

(CANCEL MAIL)

Date:Wed, 17 Nov 2004 16:59:07+0900

A ~ From:234567@***.jp

B ~ To:printservice@panacolor.ne.jp

Subject:Pana DSC Picture cancel (C1) 0411 (C2)

D ~ MIME-version:1.0

Content-type:text/plain;charset=ISO-2002-JP (E)

Content-transfer-encoding:7bit

F ~ X-mailer:PanaDSC

*Fig. 37A*

RESPONSE MESSAGE

```
HTTP/1.1 200 OK
Content-Type:text/xml      — Q1
Content-Length:1000        — Q2
```

*Fig. 37B*

ENTITY BODY

```
<s:printservice xmlns:s= "http://www.panacolor.com/printservice/" >
  <s:fee>1,200</s:fee>      — Q3
  <s:print-volume>24</s:print-volume>      — Q4
  <s:deliver-date>2004/11/10</s:deliver-date>      — Q5
</s:printservice>
```

*Fig. 39A*

RESPONSE MESSAGE

```
HTTP/1.1 200 OK
Content-Type:text/xml        Q1
Content-Length:1000          Q2
```

*Fig. 39B*

ENTITY BODY

```
<s:printservice xmlns:s= "http://www.panacolor.com/printservice/" >    Q7
  <s:fee>1,200</s:fee>    Q3
  <s:print-volume>24</s:print-volume>    Q4
  <s:deliver-date>2004/11/10</s:deliver-date>    Q5
  <s:order-number>1234</s:order-number>    Q6
</s:printservice>
```

*Fig.45*

311 DEVICE ID MANAGEMENT TABLE

| DEVICE ID | URL OF ORDER RECEPTION SERVER |
|---|---|
| A123 | http:www.???.yyy1.com |
| B456 | http:www.???.yy2.com |
| C789 | http:www.???.yy2.com |
| C789 | http:www.???.abc.com |
| C789 | http:www.panacolor.com |
| ---· | ---· |

PRINT SYSTEM

BACKGROUND OF THE INVENTION

1.Technical Field

The invention relates to a print system capable of accepting print information through a network.

2.Background Art

Hitherto, DPOF (Digital Print Order Format) is known as one of the recording formats for digital camera. DPOF is a format for recording print information such as images desired to be printed out of the images taken by a digital camera and the number of print copies in a recording medium.

With this DPOF, print information for printing automatically the taken images at a print service company or through a home printer can be recorded. That is, the print information is prepared in a format conforming to DPOF specification, and is stored in recording medium together with image data, and the print information stored in the recording medium is analyzed at the printer side, and the images can be printed in the specification designated in the print information.

In a conventional DPOF, a DPOF file is specified as a file for designating the print information. The DPOF file includes an automatic print file (AUTOPRINT. MRK) which stores print information including the number of images desired to be printed, image size, title, trimming setting, device information, date and time, user's name, user's address, user's telephone number, and others.

In a digital camera supporting DPOF, when the print information such as images to be printed and number of copies to be printed is specified, an automatic print file is created, and stored in the recording medium. When requesting printing to a print service company, an order is placed only by handing over the recording medium, and the user's labor for ordering can be saved.

In a conventional print system, for example, the print information designated by DPOF file is uploaded to an Internet print site, and the specified images may be printed at the print site according to the uploaded print information (see, for example, patent document 1).

Patent document 1: JP-A-2002-111926

SUMMARY OF INVENTION

Such print service utilizing the print system for accepting a print request via the Internet is very convenient for the user because the print request can be accepted anytime or anyplace. As digital cameras are spread more widely henceforth, demands for such print service are expected to increase. Considering such advantage, the print system for accepting print requests via the Internet seems to be demanded to be much more advanced in simplicity and convenience.

The invention is devised in the light of such background, and it is hence an object thereof to present a print system capable of accepting print requests via the Internet, in particular, a print system simpler in structure, and easier to use.

A first print system of the invention is a print system capable of processing a print order of image data through a network. The print system includes an information device for storing image data, a registration center server connected to the information device through a network, and a plurality of order reception servers. The information device, when establishing communication with either one of the plurality of order reception servers, preliminarily inquires the registration center server about an order reception server capable of accepting a print order from the information device. The registration center server specifies at least one order reception server capable of accepting a print order from the information device, according to the inquiry from the information device, and transmits an address on the network of the specified order reception server to the information device. The information device establishes communication with any one of the specified order reception servers on the basis of the address acquired from the registration center server.

The information device, when inquiring the registration center server, may send identification information for identifying the information device to the registration center server. The registration center server, on the basis of the identification information received from the information device, may specify at least one order reception server capable of accepting a print order from the information device.

The identification information of the information device may include the MAC address of the information device.

The information device, prior to formal placing of print order, may send information instructing creation of an estimation and print information specifying the print content, to the order reception server with which the communication is established. The order reception server may create an estimation according to the received print information, and sends the estimation to the information device. By acquiring an estimation before ordering, the user can decide whether or not to order printing according to the estimation result.

The information device, after receiving the estimation from the order reception server, may send information instructing a formal print order and image data to be printed to the order reception server when placing a formal print order.

It is not required to hold the print information when compiling an estimation at the order reception server side, and estimating and formal ordering can be processed independently.

The registration center server or the order reception server may have a list of print orders summed up by manufacturer of information devices. By referring to this sum list, it is possible to incentive such as cash returns depending on the number of orders to manufacturers of information devices.

When the information device is connected to the network, in the information device, a print service mode which is a mode for creating print information may be started up. Hence, the user's operation is simplified.

When the information device is connected to the network, if the information device has not been registered in the registration center server, a user registration mode may be started up for allowing the information device to be registered in the registration center server. Hence, the user's operation is simplified.

The registration center server or the order reception server may have a progress list for managing the status of progress of a received order for each order. The registration center server or the order reception server may judge whether or not to cancel, by referring to the progress list, when receiving a cancel instruction of an order from the information device.

The registration center server or the order reception server may have a delivery destination list for managing delivery destination of printed matter and a customer list for managing customer information. The information device may send a delivery destination code for specifying the delivery destination to the registration server or the order reception server. The registration center server or the order reception server may convert with reference to the delivery destination list and the customer list the delivery destination code into specified delivery destination information, such as address, telephone number or mail address of delivery destination, and send the converted delivery destination information to the delivery center for delivering the printed matter. As a result, in the information device, it is only required to enter the code, and the user's labor is saved.

The registration center server or the order reception server may have a customer list for managing customer information including information about a notifying method designated by the customer, and determine a notifying method with reference to the customer list when notifying delivery schedule to the customer.

The information device converts data size of original image data according to print size when placing a formal print order, and sends the image data with converted data size to the order reception server. As a result, while suppressing deterioration of image quality of print image, image data of small data size can be transmitted, and the transmission time can be shortened. At the same time, storage space for image data in the order reception server can be saved.

The information device may acquire reference size which is used for converting the data size, from the order reception server. It is hence possible to cope with if the print quality differs in each print service company.

A second print system of the invention is a print system capable of processing a print order of image data through a network. The print system includes an information device for storing image data, a registration center server connected to the information device through a network, and a plurality of order reception servers. The information device inquires the registration center server about an order reception server capable of accepting a print order from the information device. The registration center server specifies at least one order reception server capable of accepting a print order from the information device, according to the inquiry from the information device, and transmits an address on the network of the specified order reception server to the information device. The information device stores the address of the order reception server at the time of specified processing, and establishes communication with an order reception server by using the stored address in at least one process in the subsequent processes.

The information device may store address of the order reception server and order number for specifying the print order, while associating the address with the order number. The information device may inquire the registration center server about the order reception server, when requesting an estimation and/or when placing a formal order.

According to the print system of the invention, the information device (for example, digital camera) inquires the registration center server about the address (for example, URL) of order reception server before processing an order. As a result, in the information device, it is unnecessary to store various addresses of order reception servers, which are possibly different in each information device, and it is enough to store only the address of the order reception server. Thus, the load on the information device upon implementation is reduced. Additionally, by storing the acquired address, when the information device subsequently accesses the order reception server using the stored address, it is not necessary to acquire a new address, thus the processing load at the information device is lessened.

BRIEF DESCRIPTION OF DRAWINGS

FIG. 4 is a diagram showing an example of a customer list.

FIG. 5 is a diagram showing an example of a progress list.

FIG. 8 is an explanatory diagram of user registration screen.

FIG. 17 is a diagram showing description example of a mail for returning an estimation.

FIG. 20 is an explanatory diagram of grouping of attached images.

FIG. 21 is a diagram of description example of an order mail (with attached DPOF file).

FIG. 22 is a diagram of description example of an order mail (with attached image files).

FIG. 29 is a diagram showing description example of an image distribution mail.

FIG. 32 is a diagram of a description example of a reprint request mail.

FIG. 33 is a diagram of a description example of re-order mail.

FIG. 34 is a diagram of a description example of cancel mail.

FIG. 37 is a diagram of a description example of POST response returned to the digital camera when returning an estimation.

FIG. 39 is a diagram of a description example of POST response returned to the digital camera when returning an estimation (when order number is added when returning an estimation).

FIG. 45 is a diagram showing an example of a device ID management table.

DESCRIPTION OF REFERENCE NUMERALS

Figure 1:
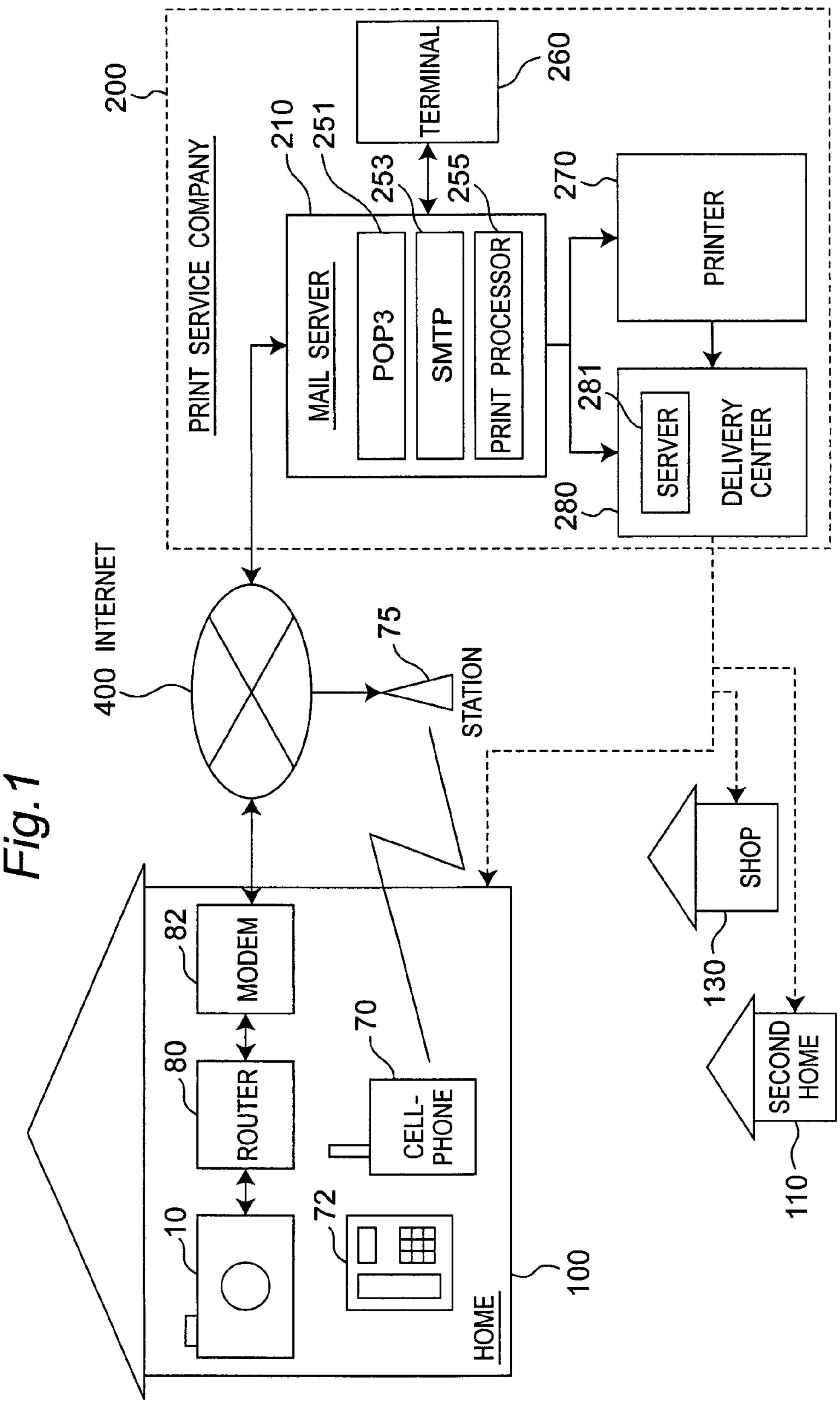
FIG. 1 is a diagram of a configuration of a print system in Embodiment 1 of the invention.

10 Digital camera
30 Cradle
50 Information processing device (PC)
80 Router
100 User's home
130 Retail shop
200 Print service company
210 Mail server
221 Customer list
223 Progress list
225 Order summary list by manufacturer
227 Delivery destination list
251 POP3 server
253 SMTP server
255 Print processor
260 Terminal
270 Printer
280 Delivery center
400 Internet

DEATILED DESCRIPTION OF THE INVENTION

Preferred embodiments of the print system of the invention are described below by referring to the attached drawings.

Embodiment 1

1. System Configuration (1) Network Configuration

FIG. 1 is a block diagram of a configuration of an embodiment of a print system of the invention. The print system includes a digital camera 10 and a mail server 210. The digital camera 10 is connected to the internet 400 by way of a router 80 and a communication modem 82 in a user's home 100. The digital camera 10 is connected to the router 80 via LAN. A cell-phone terminal 70 and a stationary telephone set 72 are also installed in the user's home 100.

The mail server 210 is installed in the print service company 200 for presenting print service, together with an information terminal 260 and a printer 270. The print service company 200 has a delivery center 280 for distributing print images. The mail server 210 is an order reception server for accepting a print request from the digital camera 10 by electronic mail. The mail server 210 is composed of a POP3 server 251, an SMTP server 253, and a print processor 255.

When the user specifies desired images in the digital camera 10 to order a print service, the image and order information are sent to the mail server 210 of the print service company 200, as order information. The order information is information for specifically designating content of the print order, and includes print information for specifying print contents (DPOF file). When the mail server 210 receives the image, the print service company 200 notifies the user of reception of image. The notifying method is preliminarily selected by the user. The notifying method includes a notice to the digital camera 10 via the Internet 400, or an electronic mail sent to the cell-phone terminal 70.

The images received on the mail server 210 are sent to the printer 270 together with print information which is a part of order information, and printed out by the printer 270 according to the print information. The order information is also sent to the server 281 at the delivery center 280. The server 281 sorts pictures printed out by the printer 270 according to the order information, and creates instruction information for delivery to the user. The delivery destination is preliminarily determined by the user. For example, any one of user's home 100, retail shop 130, or delivery destination 110 other than user's home may be selected. The retail shop 130 includes a camera shop, a DPE store, a convenience store, and others.

(2) Configuration of Digital Camera

Figure 2:
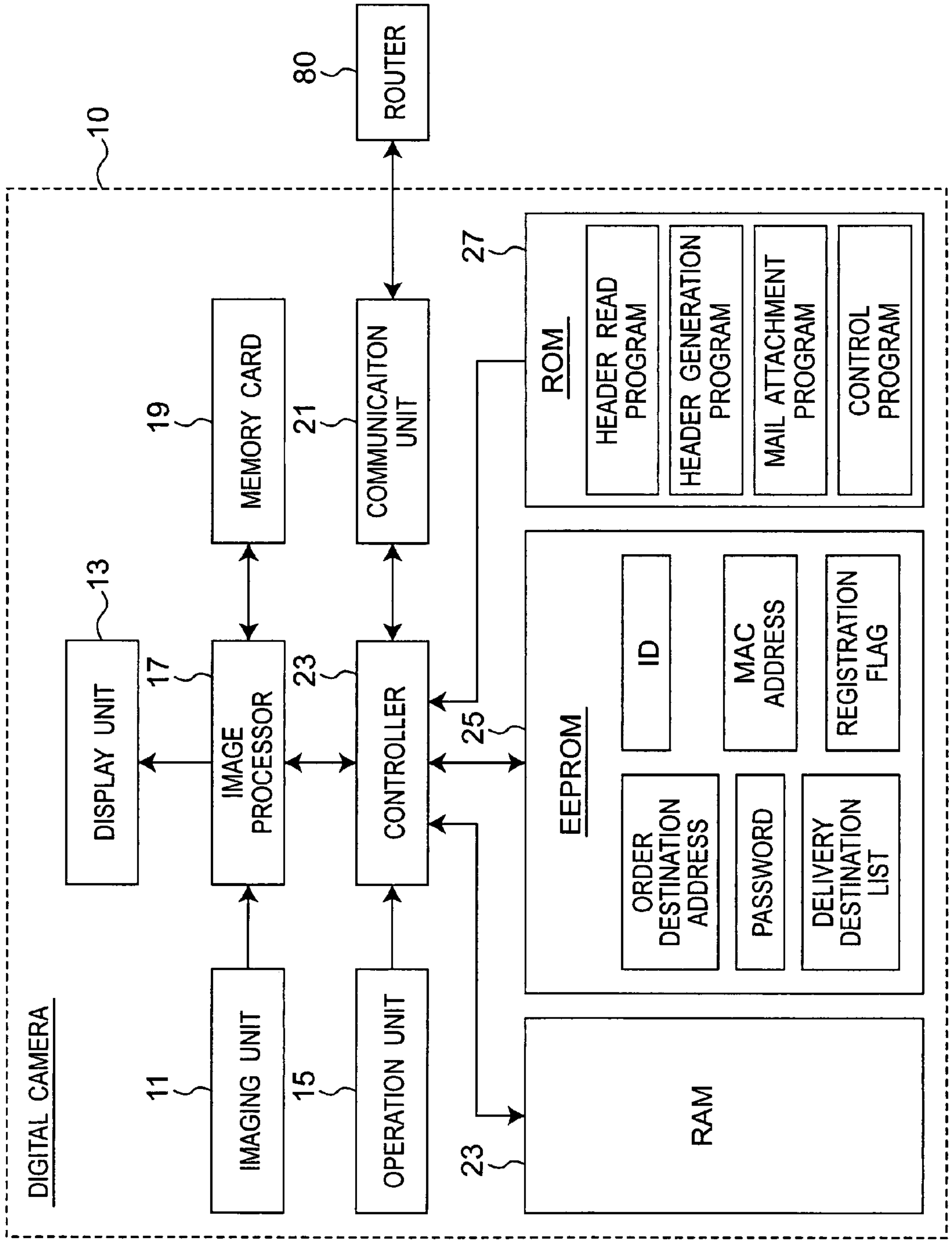
FIG. 2 is a block diagram of a configuration of a digital camera.

FIG. 2 is a block diagram of configuration of the digital camera 10. An imaging unit 11 includes CCD and others, and converts optical image information into an electrical signal. A display unit 13 includes a liquid crystal display, and displays taken image, operation guidance and others. An operation unit 15 includes buttons to be manipulated by the user. An image processor 17 processes the taken image by compression or other process. A controller 23 controls the operation of the digital camera 10. A memory card 19 is a detachable recording medium for storing the taken image data and print information. A communication unit 21 controls exchange of data with an external device.

RAM 23, EEPROM 25, and ROM 27 are storage means for storing programs to be executed by the controller 23 and information necessary for control of the digital camera 10. The EEPROM 25 stores information which needs to be rewritten, and the ROM 27 stores information which does not need to be rewritten, but all contents stored in the ROM 27 may be stored in the EEPROM 25. The EEPROM 25 stores mail address to which an order is sent, device ID of the digital camera 10, password for authentication, MAC address of the digital camera 10, list information of delivery destinations of printed matter, and registration flag showing user registration/not-registration. The device ID of the digital camera 10 may be, for example, a manufacturing serial number. As information for identifying the digital camera 10 without using device ID, the MAC address may be used alone. The ROM 27 stores header read program of electronic mail, header generation program of electronic mail, attachment program to electronic mail, and other control programs for controlling operations of the digital camera. Programs stored in the ROM 27 are loaded as required in the RAM 23, and executed by the controller 23. However the controller 23 may directly read the program from the ROM 27 to execute it.

(3) Configuration of Mail Server

The mail server 210 includes the POP3 server 251, the SMTP server 253, and the print processor 255 as mentioned above. The POP3 server 251 presents a function of receiving an electronic mail through the Internet 400, and the SMTP server 253 presents a function of sending electronic mail through the Internet 400. Mail account (not shown) of the digital camera 10 is set in the mail server 210.

Figure 3:
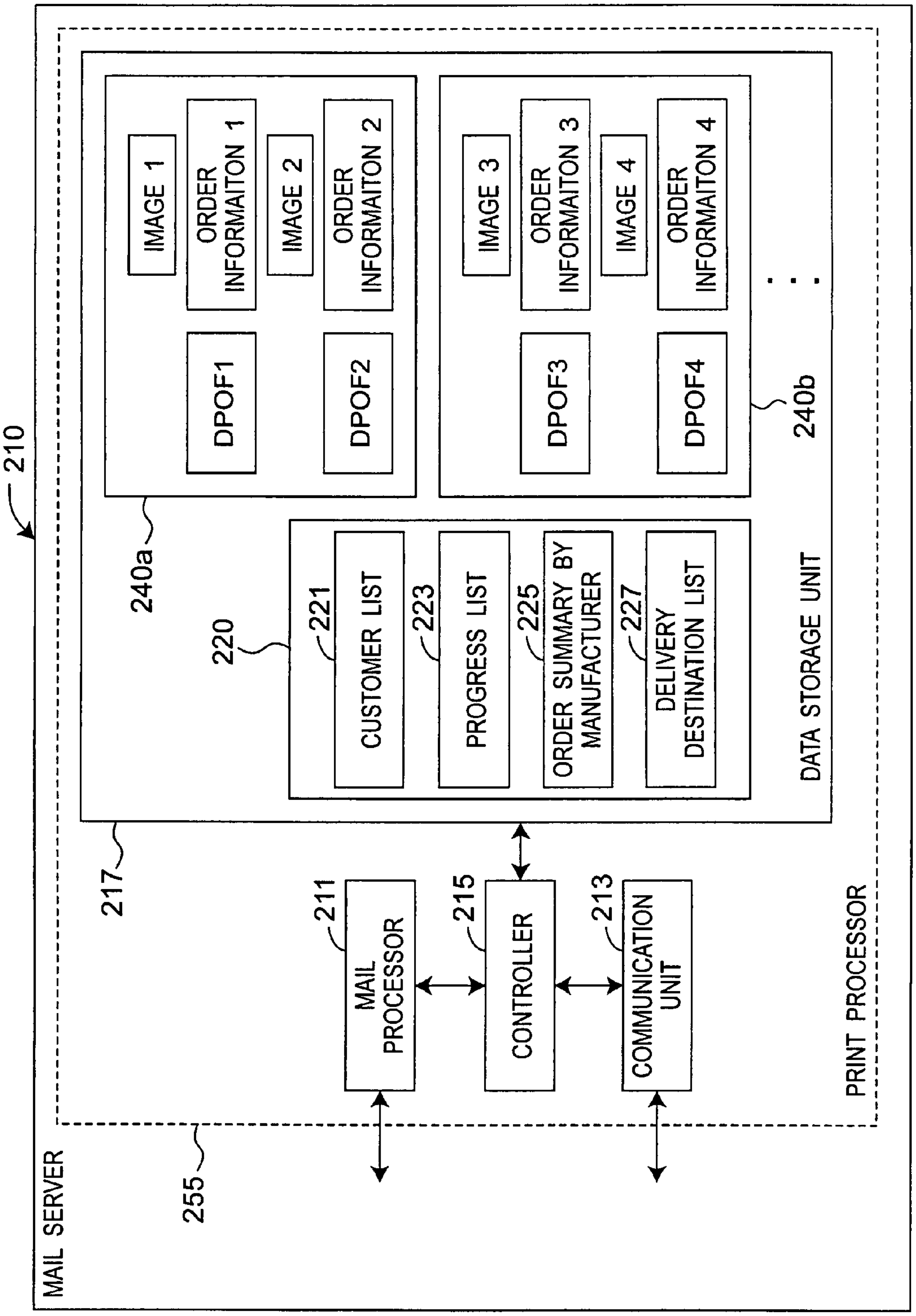
FIG. 3 is a diagram of a specific configuration of a print processor of a mail server.

FIG. 3 shows a specific configuration of the print processor 255 of the mail server 210. The print processor 255 includes a mail processor 211 for processing electronic mails about the POP3 server 251 and the SMTP server 253, a communication unit 213 for communicating with external device of the mail server 210, a controller 215 for controlling the print processor 255, and a data storage unit 217 for storing various data necessary for control.

The mail processor 211 takes out the content of mail received from the POP3 server 251, or places the mail to be sent to the SMTP server 253. The communication unit 213 sends the information to the printer 270 or the server 281 in the delivery center 280. The controller 215 controls the entire operation of the print processor 255.

The data storage unit 217 includes a region 220 for storing various lists for managing the print service, and user data regions 240*a*, 240*b*, . . . for storing order information from users.

The region 220 for storing various lists stores a customer list 221, a progress list 223, an order summary list by manufacturer 225, and a delivery destination list 227. The customer list 221 is a list of registration information of users, and its example is shown in FIG. 4. The MAC address is 48-bit information, however it is shown in alphanumeric six digits in FIG. 4 for the sake of convenience. The progress list 223 is a list for managing the status of progress of print operation, and its example is shown in FIG. 5. The order summary list by manufacturer 225 is the order acceptance statistics summing up the accepted order by manufacturer of digital cameras by which customers place print orders. According to the statistics, the print service company can pay cash back to the manufacturers of digital cameras. The delivery destination list 227 manages information about delivery destinations, and stores the information by relating the delivery destination code with address of delivery destination, name of delivery destination, and others.

User data regions 240*a*, 240*b*, . . . store image data, order information, and DPOF file. The user data regions 240*a*, 240*b*, . . . are provided in each user. The DPOF file is a part of order information. The order information is information about order, other than print information specified by DPOF file. For example, the order information includes information about a delivery destination and a notifying method of delivery announcement. For the same user, different orders are stored in the same user region. Size of user data regions 240*a*, 240*b*, . . . is set, for example, at 10 MB.

2. System Operation

Operation of the print system of the embodiment is described below.

Figure 6:
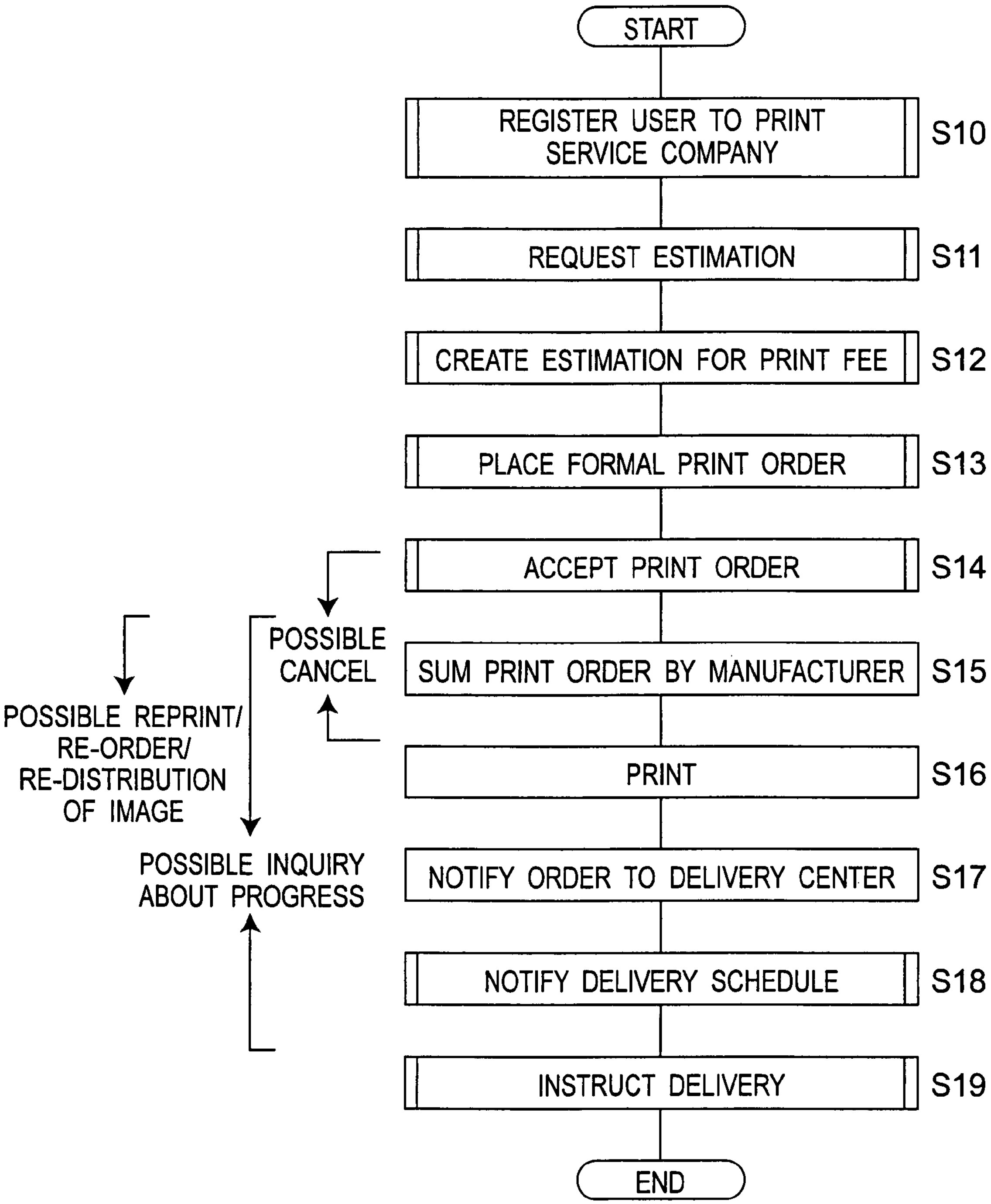
FIG. 6 is a general flow diagram about print service from print order to print delivery with the print system of the invention.

FIG. 6 shows a general flow about the print service from print order to print delivery with the print system of the embodiment. Procedure of the print system is sequentially described below at every step shown in FIG. 6.

(1) User Registration (Step S10 in FIG. 6)

The user, prior to utilizing the print service of this embodiment, must register in the print service company 200 (S10 in FIG. 6).

Figure 7:
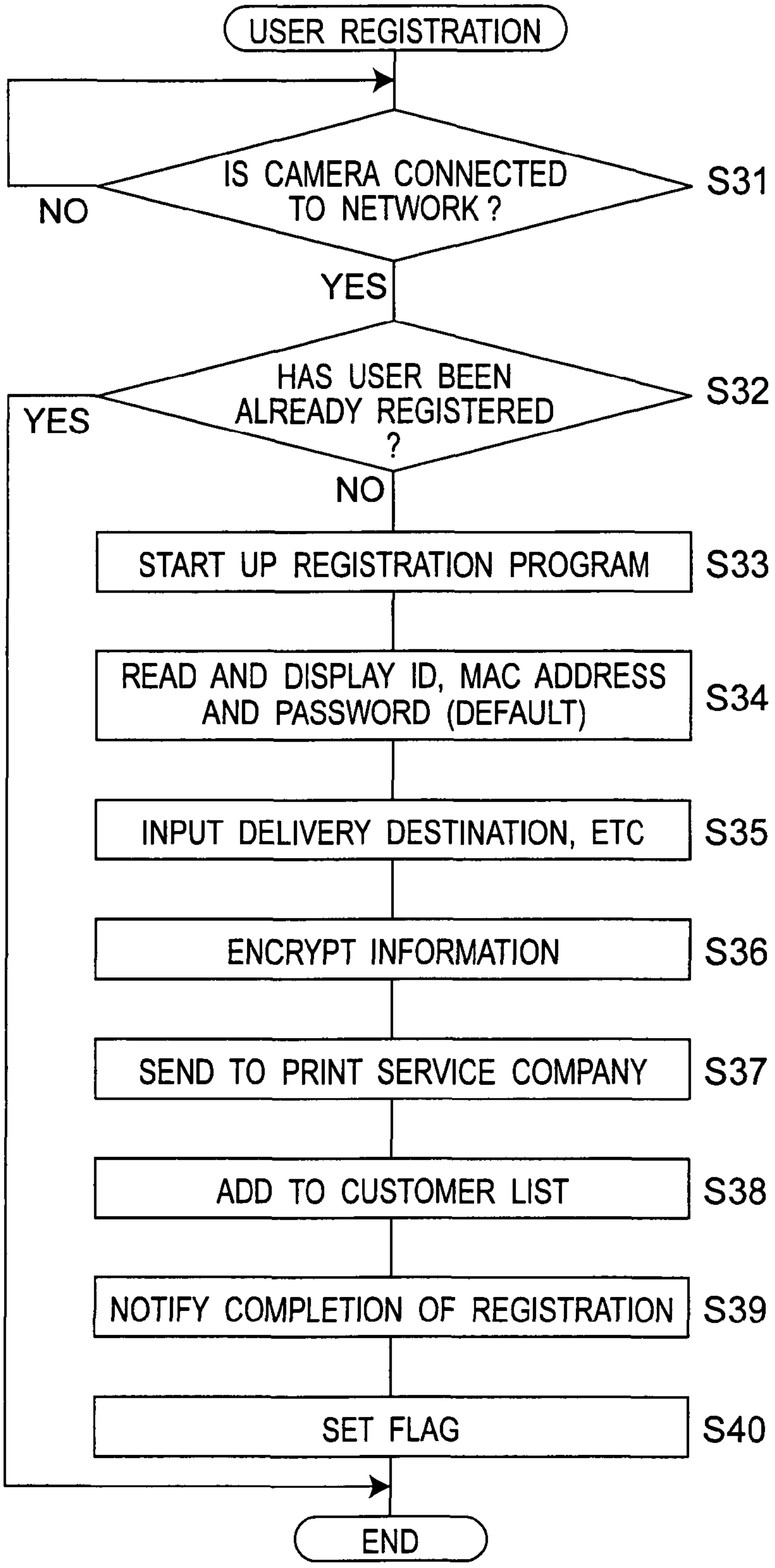
FIG. 7 is a flowchart of user registration process.

Referring to FIG. 7, procedure of user registration is explained.

First, the user connects the digital camera 10 to the network (household LAN, etc.). When the digital camera 10 is connected to the network (Yes at S31), the controller 23 refers to the registration flag in the EEPROM 25, and checks if the user has been already registered or not (S32). When the user has been already registered, this process is terminated. If the user is not registered, the registration program stored in the ROM 27 is started (S33).

When the registration program is started, the user registration mode is started up, and the user registration screen as shown in FIG. 8 is shown on the display unit 13 of the digital camera 10. On this screen, the user enters necessary items, including the password for authentication, credit card number for payment, delivery destination information of printed matter (delivery destination 1, delivery destination 2, delivery destination 3), user's mail address for communication with the user, telephone number, name of order person, and name of recipient. When the delivery destination is camera shop or other retail shop, those shops may be preliminarily assigned with shop codes, and the shop codes may be entered. As a result, user's labor or error in input of delivery destination can be lessened.

Consequently, the device ID, MAC address, and password are read out from the EEPROM 25, and displayed on the display unit 13 (S34). User registration information, such as delivery destination, entered by the user on the operation unit 15 is acquired (S35), and the acquired user registration information is encrypted with public key system or secret key system (S36). The password is set initially to a default value (for example, 0000), but then it can be set to other number newly by the user.

The controller 23 transmits the encrypted user registration information to the mail server 210 of the print service company 200 through the network 400 (S37). The mail server 210 decrypts the received user registration information, and adds the decrypted information to the customer list 221 (S38). When successfully added to the customer list 221, the mail server 210 notifies the user of completion of registration (S39). That is, the mail server 210 sends an electronic mail notifying completion of registration to the digital camera 10. The digital camera 10 receives this notice (electronic mail), and sets the registration flag in the EEPROM 25 to "Registered" (S40). Hereinafter, by referring to this registration flag, it is judged whether the user is registered or not.

(2) Requesting and Creating an Estimation (Steps S11, S12 in FIG. 6)

After completion of user registration, the user can place a print order of image from the digital camera 10. When placing a print order of images, the user first specifies the images to be printed and the print information, and requests creation of an estimation to the print service company 200 (S11 in FIG. 6). This request is made by transmitting an electronic mail from the digital camera 10 to the print service company 200 through the network.

Figure 9:
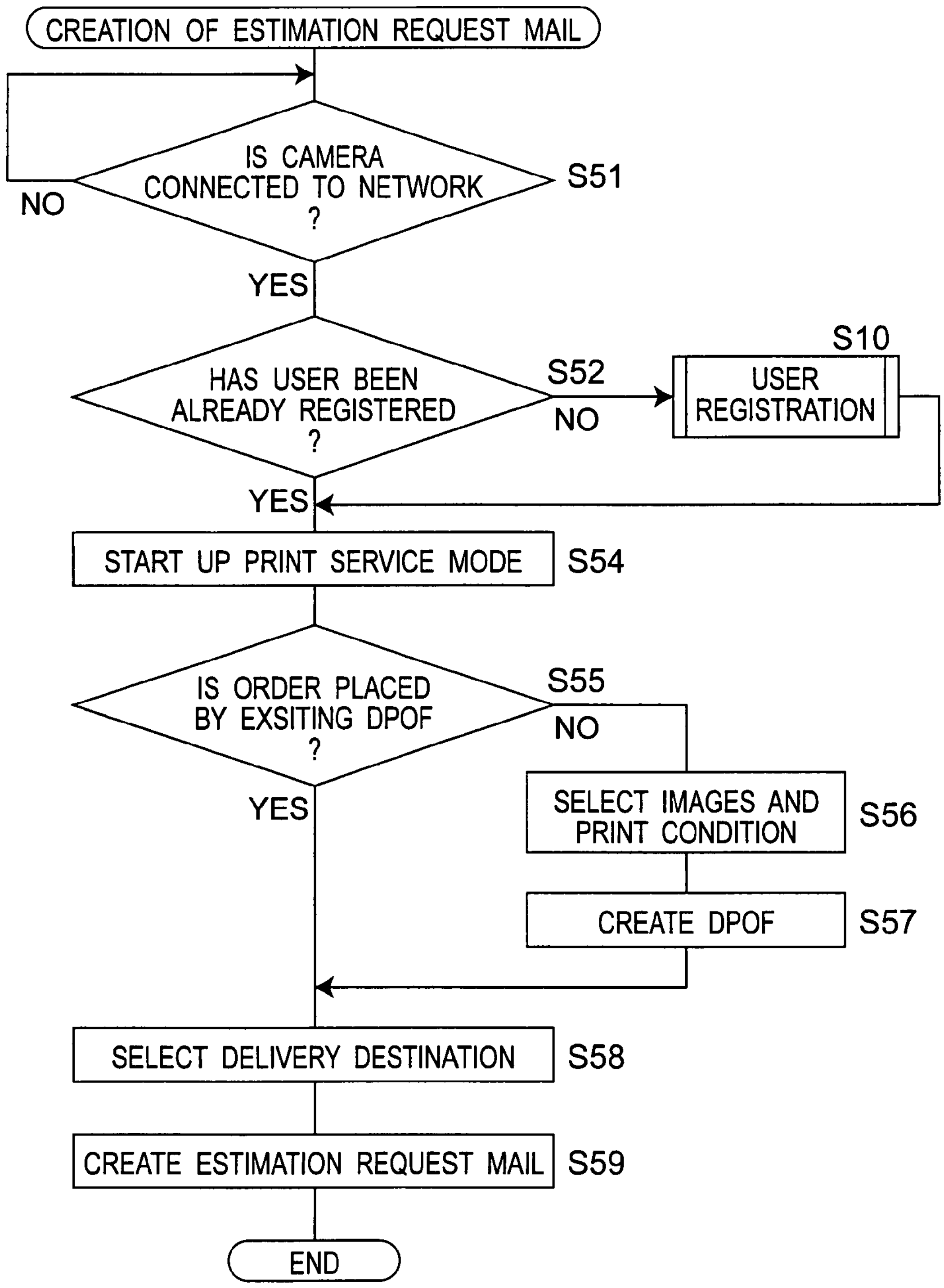
FIG. 9 is a flowchart of creating process of an electronic mail for requesting an estimation.

Referring to FIG. 9, the creating procedure of mail for requesting an estimation is explained.

When requesting an estimation, the user connects the digital camera 10 to the network (LAN). When the digital camera 10 is connected to the network (Yes at S51), the controller 23 refers to the registration flag in the EEPROM 25, and checks if the user has been already registered or not (S52). If the user is not registered, the user registration process shown in FIG. 6 is executed (S10).

Figure 10:
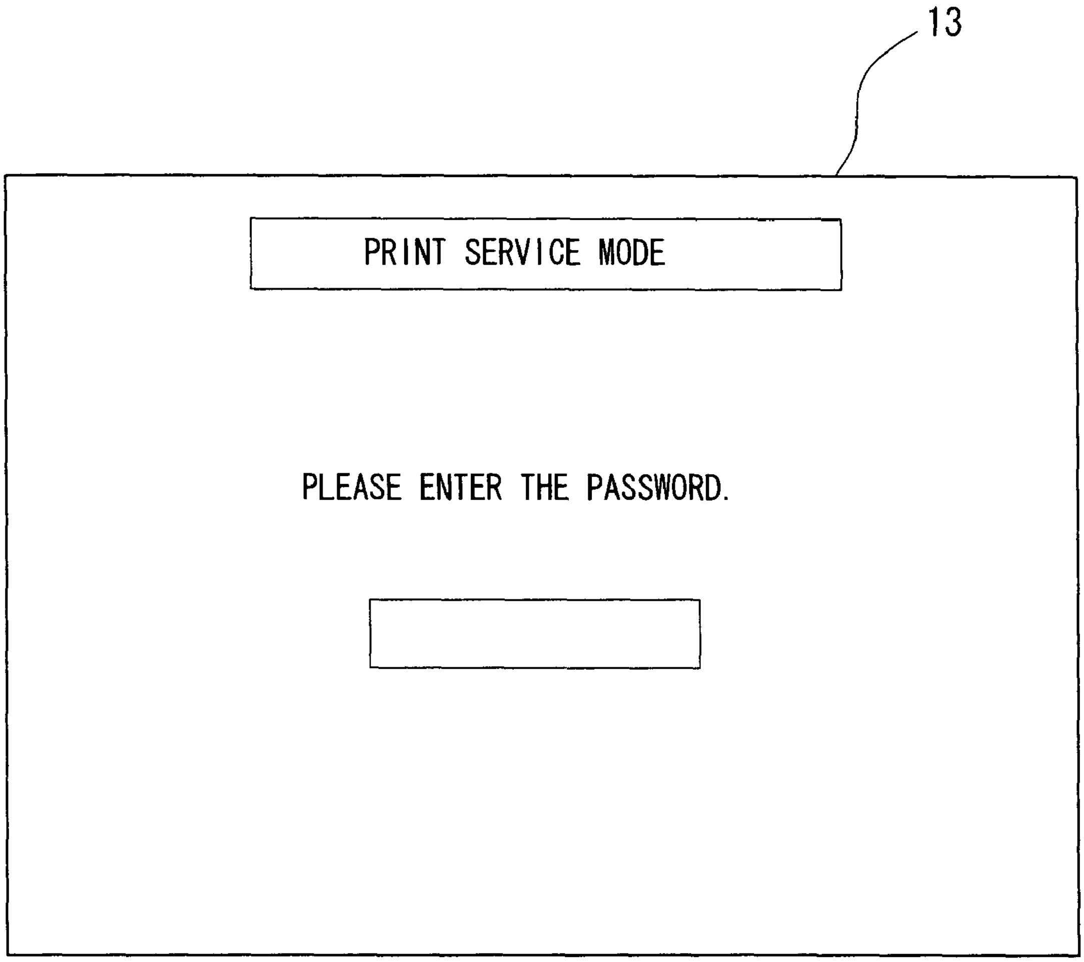
FIG. 10 is a diagram of an entry screen of a password in a print service mode.
Figure 11:
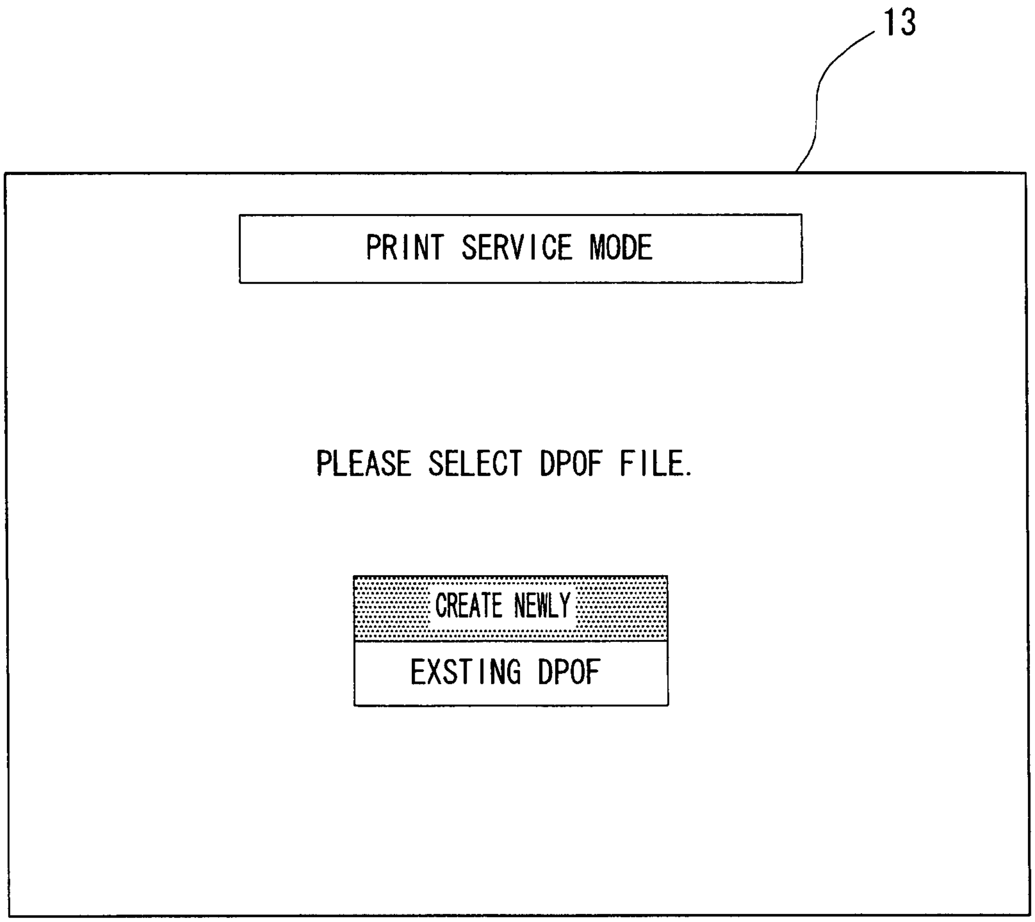
FIG. 11 is a diagram of screen for inquiry to user whether or not create DPOF file newly in a print service mode.
Figure 12:
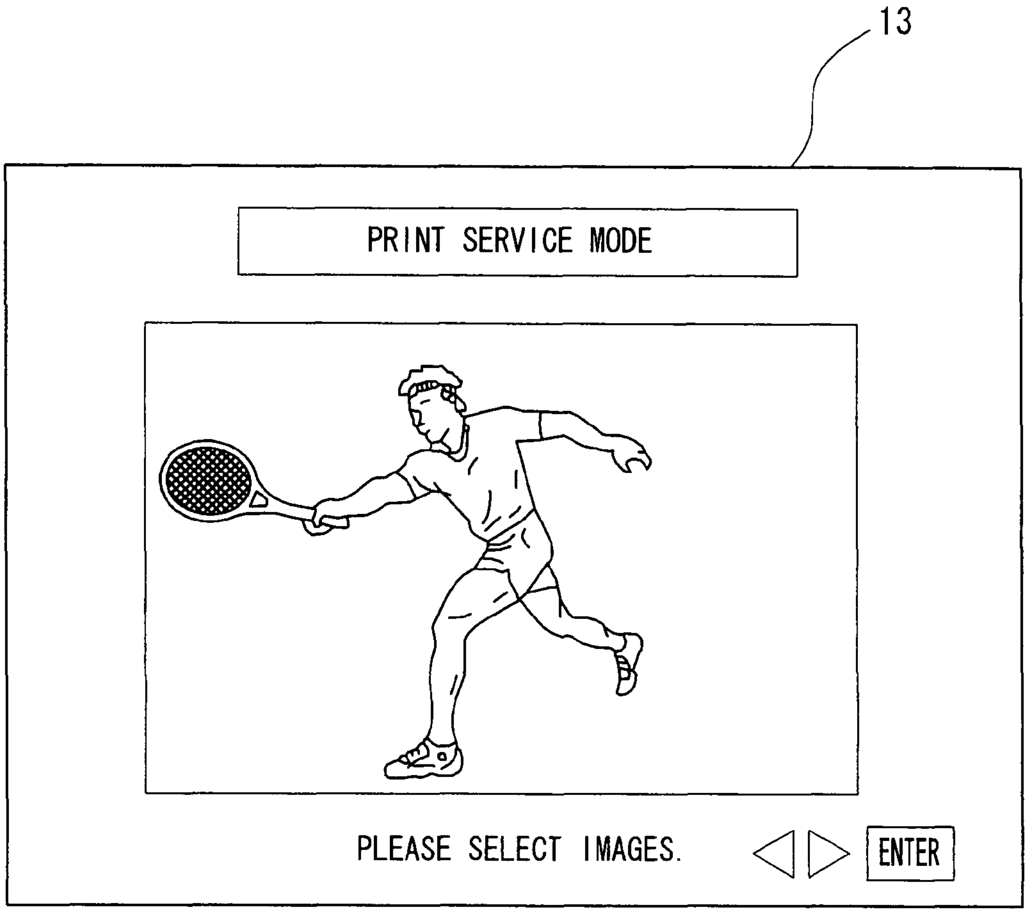
FIG. 12 is a diagram showing a screen for image selection in a print service mode.
Figure 13:
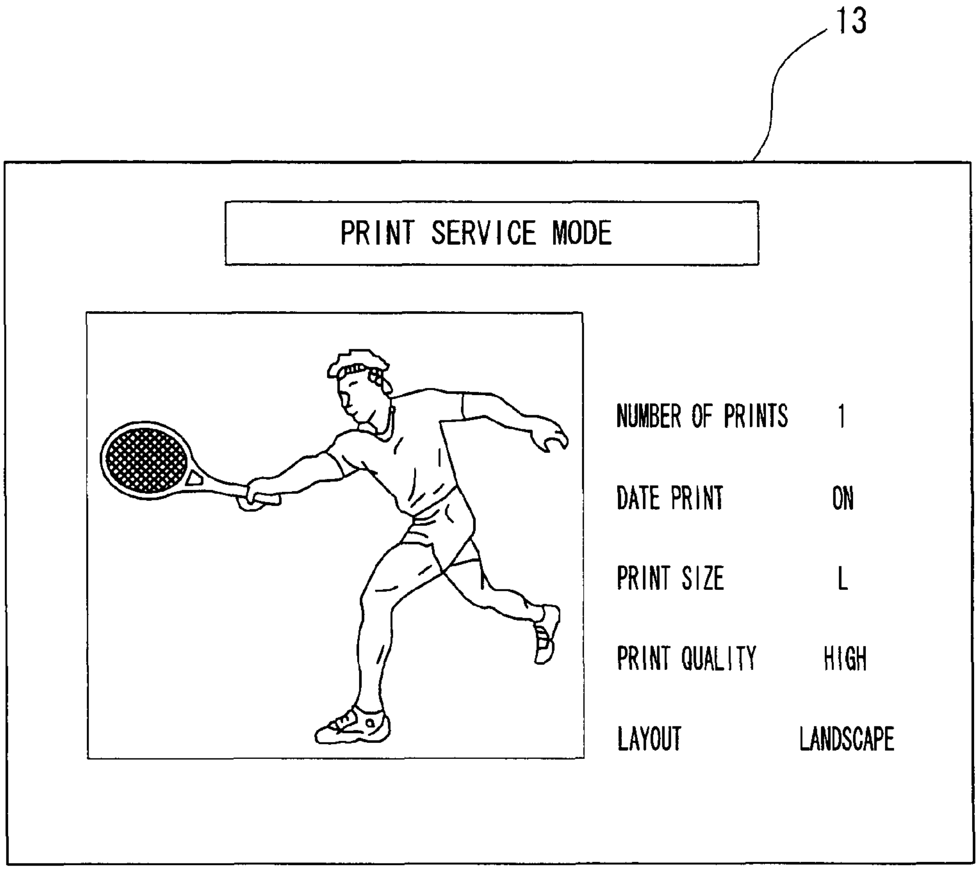
FIG. 13 is a diagram showing an entry screen of print condition in a print service mode.
Figure 14:
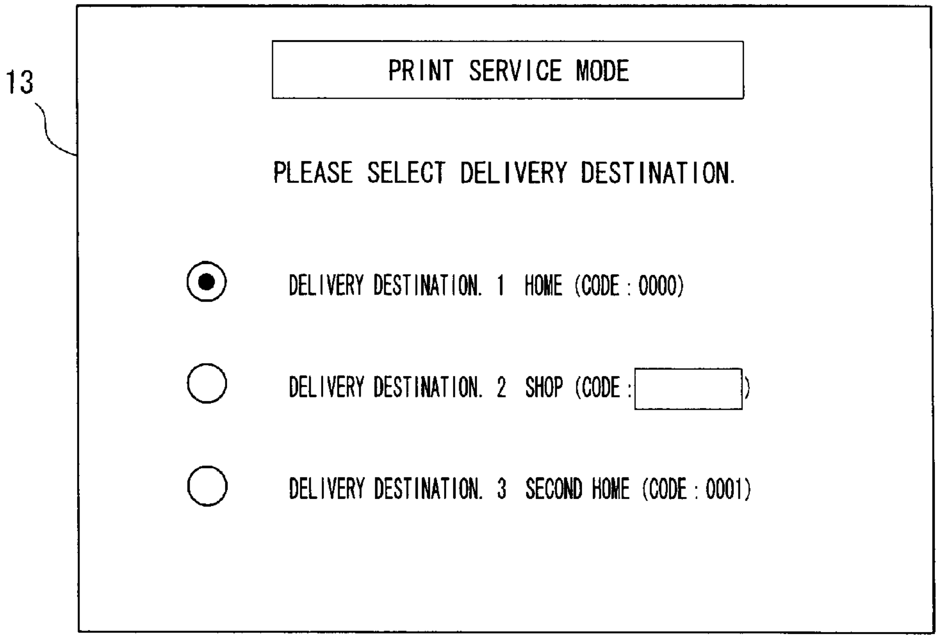
FIG. 14 is a diagram showing a screen for selection of delivery destination in a print service mode.

After that, the controller 23 starts up a print service mode (S54). In the print service mode, as shown in FIG. 10, the screen prompting the user for entry of the password is displayed. When the password is entered on the screen, the screen displays as shown in FIG. 11, and inquires the user whether or not to create a DPOF file newly (S55). When the user requests to create a DPOF file newly, a screen for prompting the user for selection of images (see FIG. 12) and entry of print condition (see FIG. 13) is displayed, and the information entered by the user is acquired (S56). According to the information entered by the user, a DPOF file is created (S57). The screen prompting the user to select delivery destination as shown in FIG. 14 is displayed, and the information of the selected delivery destination is acquired (S58). Finally, according to the entered information, an electronic mail for requesting an estimation is created (S59).

In this embodiment, when requesting an estimation or placing a print order and others, necessary information for them is described in a header section in the mail exchanged between the digital camera 10 and mail server 210, and the image data to be printed and print information (DPOF file) are attached to the electronic mail as required. Necessary information is not written in a body section of the mail. With this configuration, the digital camera 10 can create a mail for transmission only by preparing a program for creating a header and a program for the mail attachment, and the system of digital camera can be simplified, and the capacity of the ROM 27 can be reduced.

Figure 15:
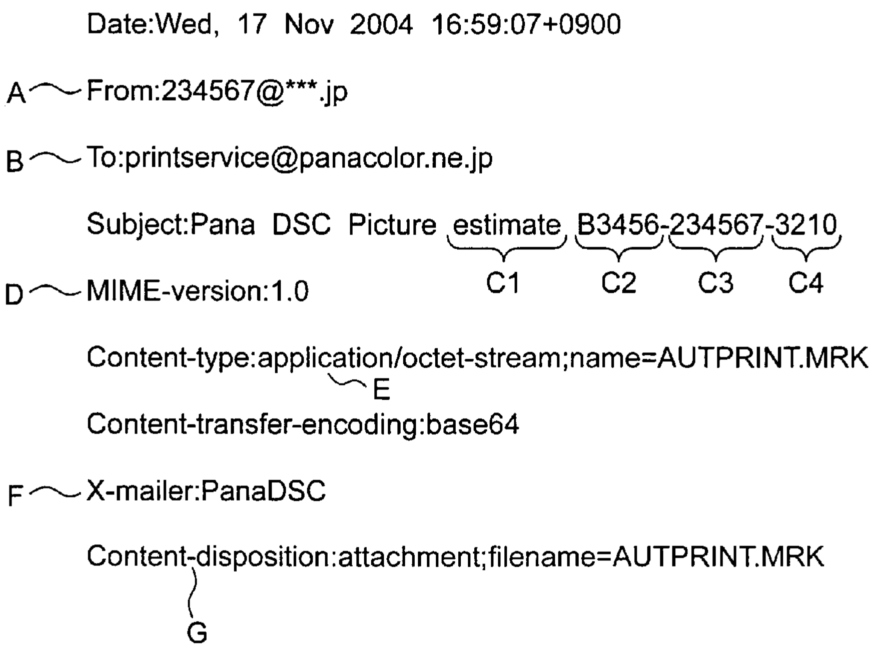
FIG. 15 is a diagram showing description example of a mail for requesting an estimation.

FIG. 15 shows an example of description of a mail for requesting an estimation created in the procedure mentioned above. The content shown in the diagram shows contents specified in the header section of the electronic mail. The description A of "From: . . . " shows the sender's address of the electronic mail, that is, the specific address of the digital camera 10. The description B of "To: . . . " shows the recipient's address of the electronic mail, that is, the address of the service company. In this embodiment, in particular, the print order information is written in the Subject of the header section of the mail. In the example in FIG. 15, in the Subject, C1 "estimation" shows a command for requesting an estimation. The subsequent description C2 specifies the device ID of the digital camera 10, the description C3 shows the MAC address of the digital camera 10, and the description C4 indicates the delivery destination code. The description D of "MIME-version" specifies the format of the electronic mail. The description E of "Content-type" shows that the mail has no text in the body section but has an attached DPOF file (AUTOPRINT.MRK). The description F of "X-mailer" specifies the name of mail software. The description G of "Content-disposition" specifies execution of attachment of file. Thus, necessary information is described in the header section of the electronic mail, but not described in the body section.

Figure 16A:
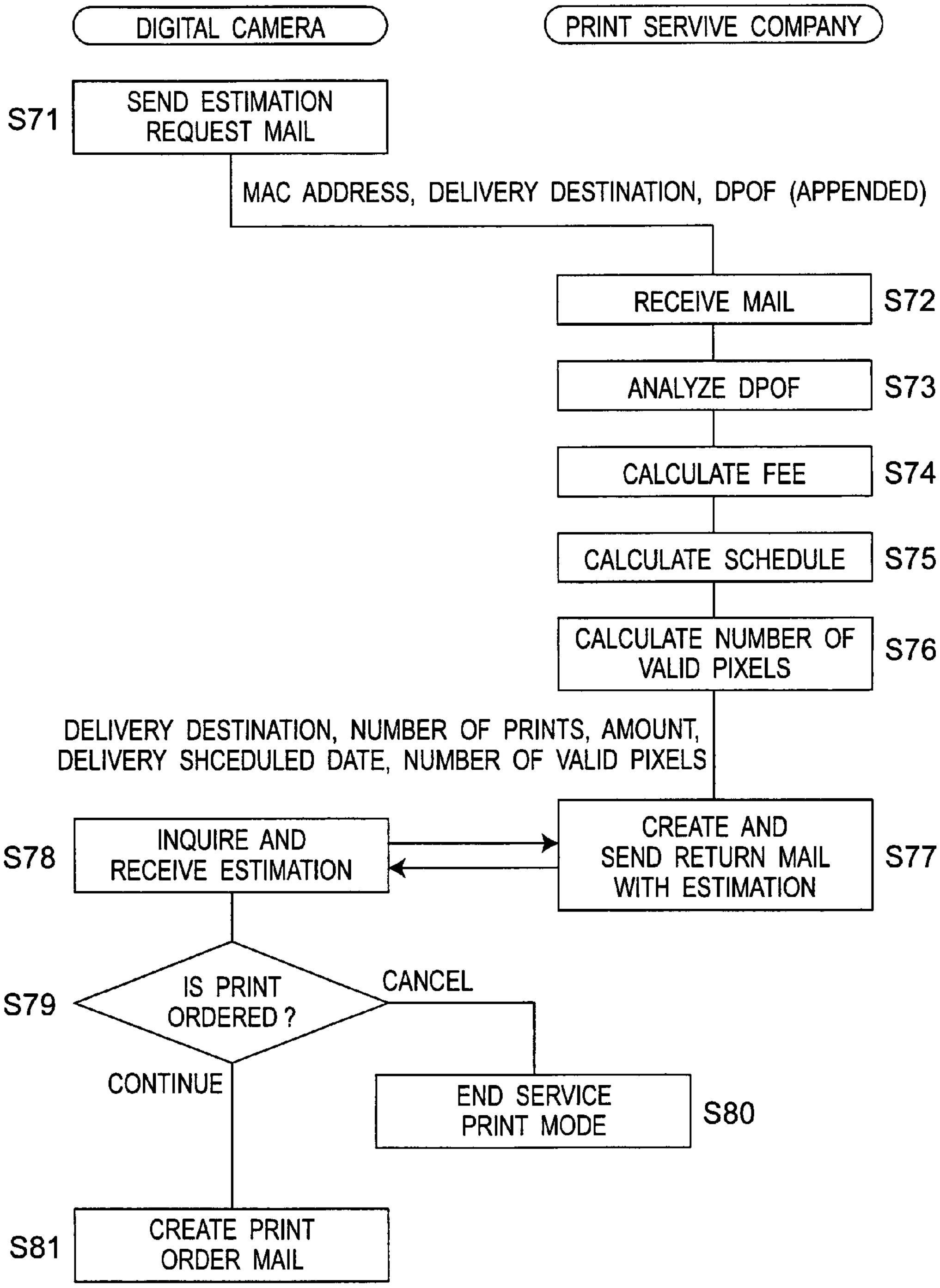
FIG. 16A is an explanatory diagram of procedure for requesting a print estimation by a digital camera 10, creating the estimation at a print service company, and sending it back to the digital camera.

FIG. 16A is an explanatory diagram of procedure of requesting a print estimation at the digital camera 10, creating the estimation at the print service company 200, and sending it to the digital camera in reply to the request.

In FIG. 16A, the digital camera 10 sends a mail for requesting an estimation to the mail server 210 of the print service company 200 (S71). The mail server 210 receives this mail for requesting an estimation (S72), analyzes the attached DPOF file (S73), and calculates the print charge on the basis of the specified number of print copies and size (S74). It also estimations the number of days (schedule) required for delivery on the basis of the information of delivery destination specified in the Subject of the header section of the mail for requesting an estimation (S75).

Further, with the print size and other information, the number of effective pixels is calculated (S76). The number of effective pixels is the number of pixels least required in a range not lowering the print quality of the image. For example, if the print size is L, quality of a finished picture from an original image of 4,000,000 pixels is not so much different from that of a finished picture from an original image of 2,000,000 pixels. However, for an original image of 1,000,000 pixels, the quality of the finished picture is obviously inferior. This means that when the print size is L, a print image with sufficiently high picture quality can be obtained from an original image if the number of pixels of the original image is at least 2,000,000 pixels. Accordingly, in the present case, the number of effective pixels is set at 2,000,000 pixels. The number of effective pixels depends on the print size. The larger the print size, the greater is the number of effective pixels.

After completion of the calculations, an electronic mail (estimation return mail) which information such as delivery destination, number of print copies, estimated fee, delivery schedule date, and number of effective pixels is described in the Subject in the header section is created and sent to the mail address of the digital camera 10 (S77). FIG. 17 shows an example of an estimation return mail.

Then, by inquiry from the digital camera 10 to the POP3 server 251 in the mail server 210, the digital camera receives the delivery destination and other information from the mail server (S167). An example of this mail is shown in FIG. 17. The mail shown in FIG. 17 is a return mail to the mail shown in FIG. 15, and the contents of description A and description B are inverted from the mail shown in FIG. 15. "estimation OK" in the description C1 means that the estimation request is accepted. The description C2 shows the total number of print copies, or 45 copies in this example. The description C3 shows the estimation amount, or 2,550 yen in this example. The description C4 shows the delivery destination. The description C5 shows the delivery schedule date, or Nov. 17, 2004, in this example. The description C6 shows the number of effective pixels, or 2M (mega) pixels in L size in this example. The description E in this example shows no text and no attached file. Thus, in the estimation return mail, too, necessary information is written in the header of the mail, especially in the "Subject", and transmitted.

Figure 18:
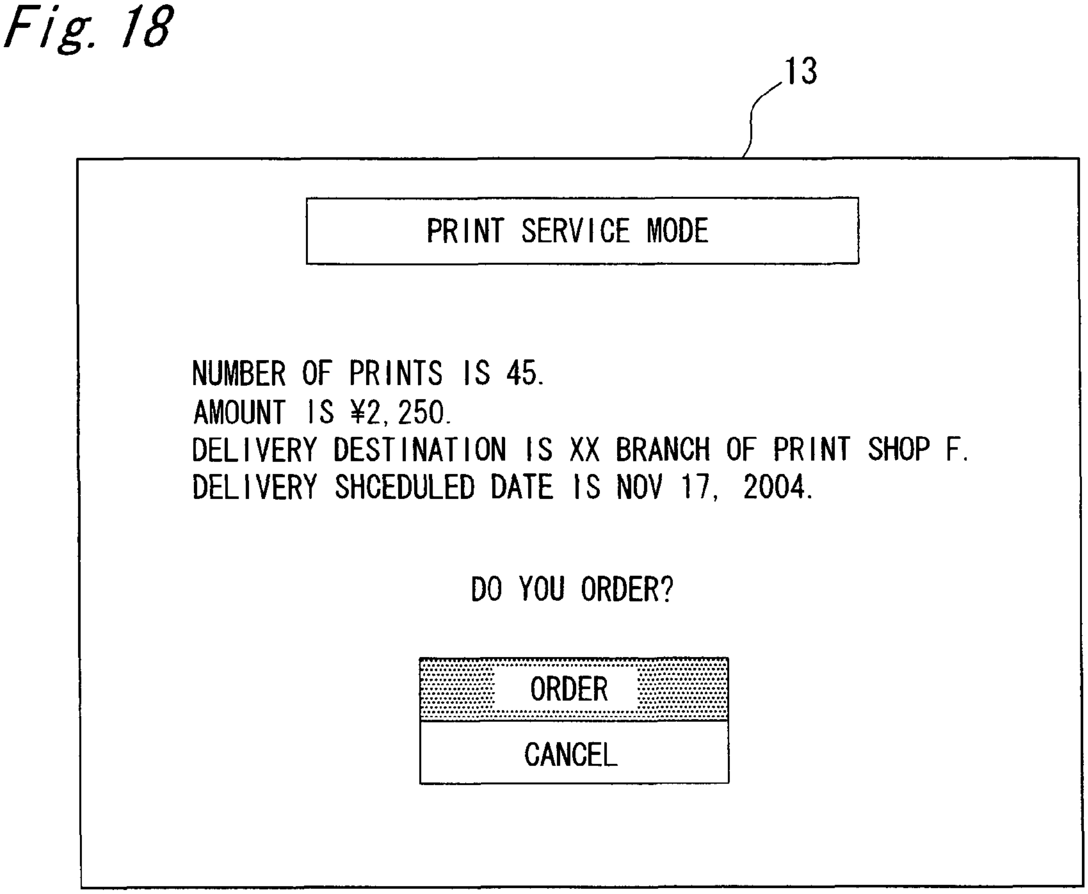
FIG. 18 is diagram showing a screen for displaying the estimation content in a print service mode.

The digital camera 10 inquires the mail server 210, and receives the estimation return mail (S78). The received information is shown in the display 13 as shown in FIG. 18, prompting the user to decide whether or not to order (S79). When the user cancels the order, the controller 23 quits the print service mode (S80). When the user manipulates and instructs to continue the order without canceling, the step goes to creation process of a print order mail for placing a formal print order (S81).

Figure 16B:
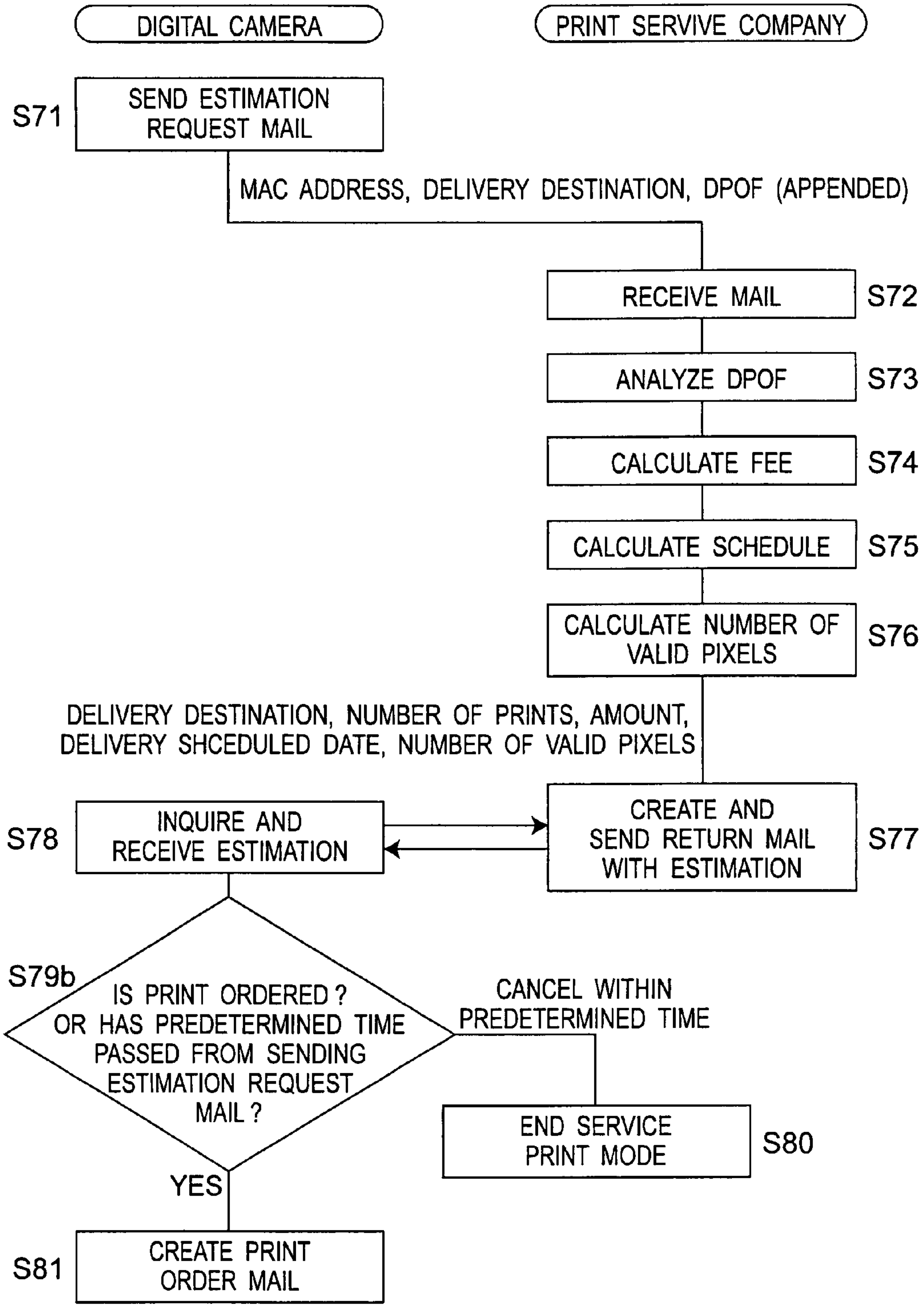
FIG. 16B is an explanatory diagram of a modified procedure for requesting a print estimation by a digital camera 10, creating an estimation at print service company, and sending it back to the digital camera.

In the example in FIG. 16A, at step S79, after receiving the estimation returned from the mail server 210, only when the user manipulates and instructs to continue the order, the step goes to creation of a print order mail for placing a formal print order (S81). However the following modified example is possible. That is, in addition to the case of the user's instruction to order, as shown in FIG. 16B, a specified time elapses after transmission (S71) of a mail for requesting an estimation (S79*b*), the step may be automatically advanced to the process for placing a formal print order (S81). In this case, preferably, a certain limitation is provided. For example, the upper limit of the estimation amount or upper limit of number of prints is provided. When the estimation amount or the number of prints exceeds the upper limit, the process for placing a formal order is not performed automatically even if the specified time elapses. As a result, even if an excessive amount is ordered by user's error, the user can be protected appropriately. The upper limit may be set freely by the digital camera 10.

(3) Placing of a Formal Print Order, Receiving of Print Order (Steps S13 and S14 in FIG. 6)

Figure 19:
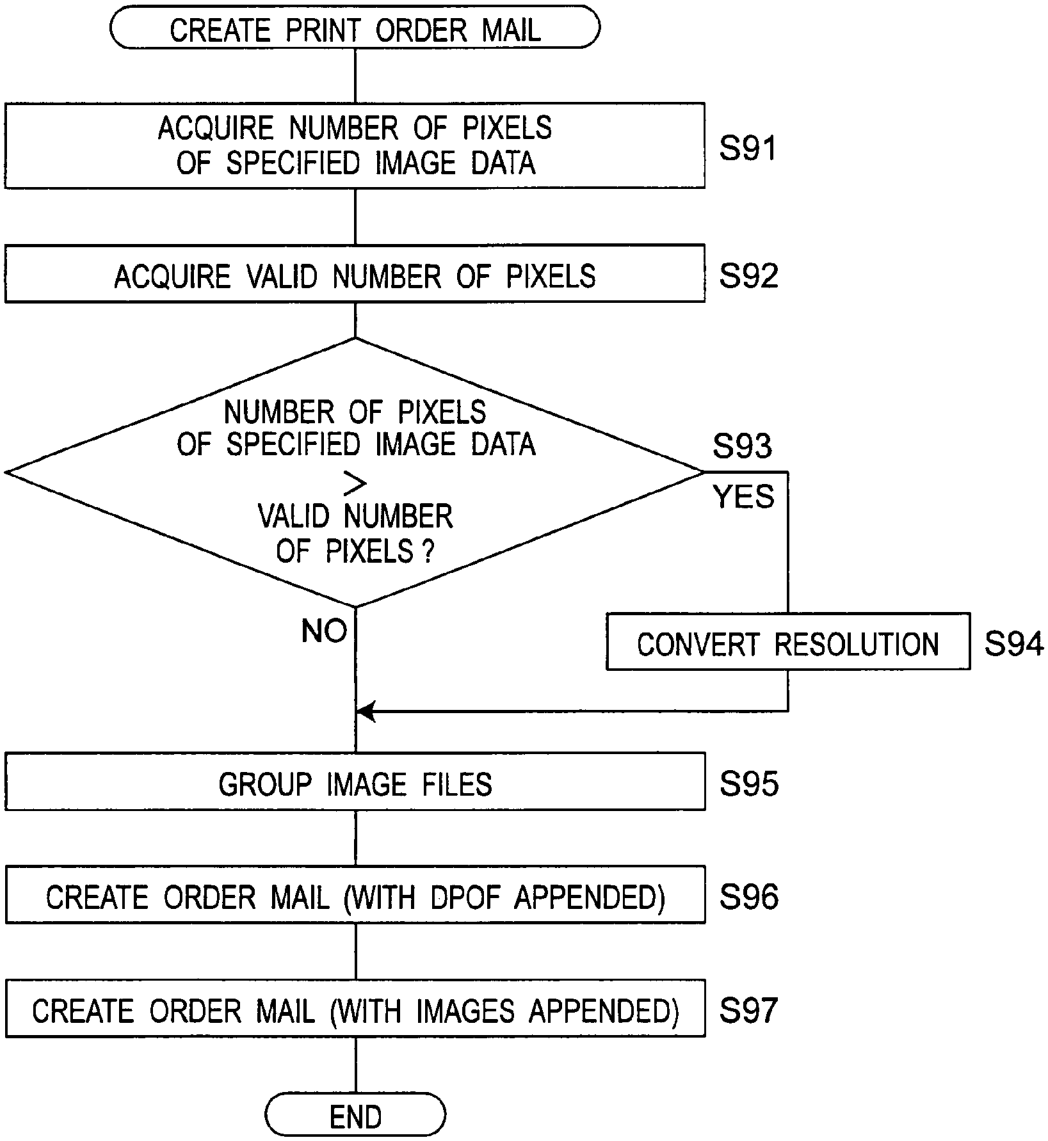
FIG. 19 is a flowchart of creating process of a print order mail for placing a formal print order.

When the estimation of the print service (S12 in FIG. 6) is over, the step advances to the process for placing a formal print order (S13 in FIG. 6). First, to place a formal print order, a print order mail is created. FIG. 19 shows the procedure of creating a print order mail for placing a formal print order.

In FIG. 19, the number of pixels of the image data specified by the DPOF file is acquired from the header information of each image file (S91). The information of number of effective pixels is acquired from the header of the received estimation return mail (S92). The number of pixels of the specified image is compared with the number of effective pixels (S93). If the number of pixels of the specified image is greater, the resolution of the specified image is changed so that the number of pixels of the specified image may be equal to or slightly larger than the number of effective pixels (S94). Instead of resizing the image by changing the resolution, the image may be resized by changing the compression rate.

Image files are grouped in some groups (S95). A mail is created in each group. The grouping is made so that the total of data size of plural image data in each group may be settled within a specific size. For example, as shown in FIG. 20A, when five images from image 1 to image 5 are specified by the DPOF file, the images are grouped in the specified sequence so that the total of image data size may be settled within a specific size as shown in FIG. 20B. In the example in FIG. 20B, image files are divided in three groups. This grouping is required because size of data that may be attached to one mail is limited and the data size of the attached data must be suppressed within this limit. The grouping may be done by a specified number of images (for example, one image). That is, a specified number of images may be attached to one mail. In this case, the specified number is determined so that the total data size of attached images may be settled within a limit of maximum data size of attachment to one mail.

Then, an order mail is created (S96, S97). The order mail includes a mail for attaching DPOF, and a mail for attaching image. FIG. 21 shows a description example of an order mail for attaching DPOF. In the diagram, the description C1 of "order" means a formal order. The descriptions C2, C3, and C4 respectively denote the device ID, MAC address, and delivery destination code. The description E shows the mail has no body section, but has an attached DPOF file (AUTOPRINT.MRK). FIG. 22 shows a description example of the order mail for attaching image. In the drawing, the description C1 of "image" is a command showing transmission of image data. The description C2 and C3 respectively denote the device ID and MAC address. The description C4 is an identifier showing the sequence of image mails, specifying what number the mail is among the order mails for attaching images. In the example in FIG. 20B, three mails with attached image are sent, and the description C4 specifies what number mail it is. The description E shows the mail has no text in the body section, but has an attached image file (P1000031.JPG).

Figure 23:
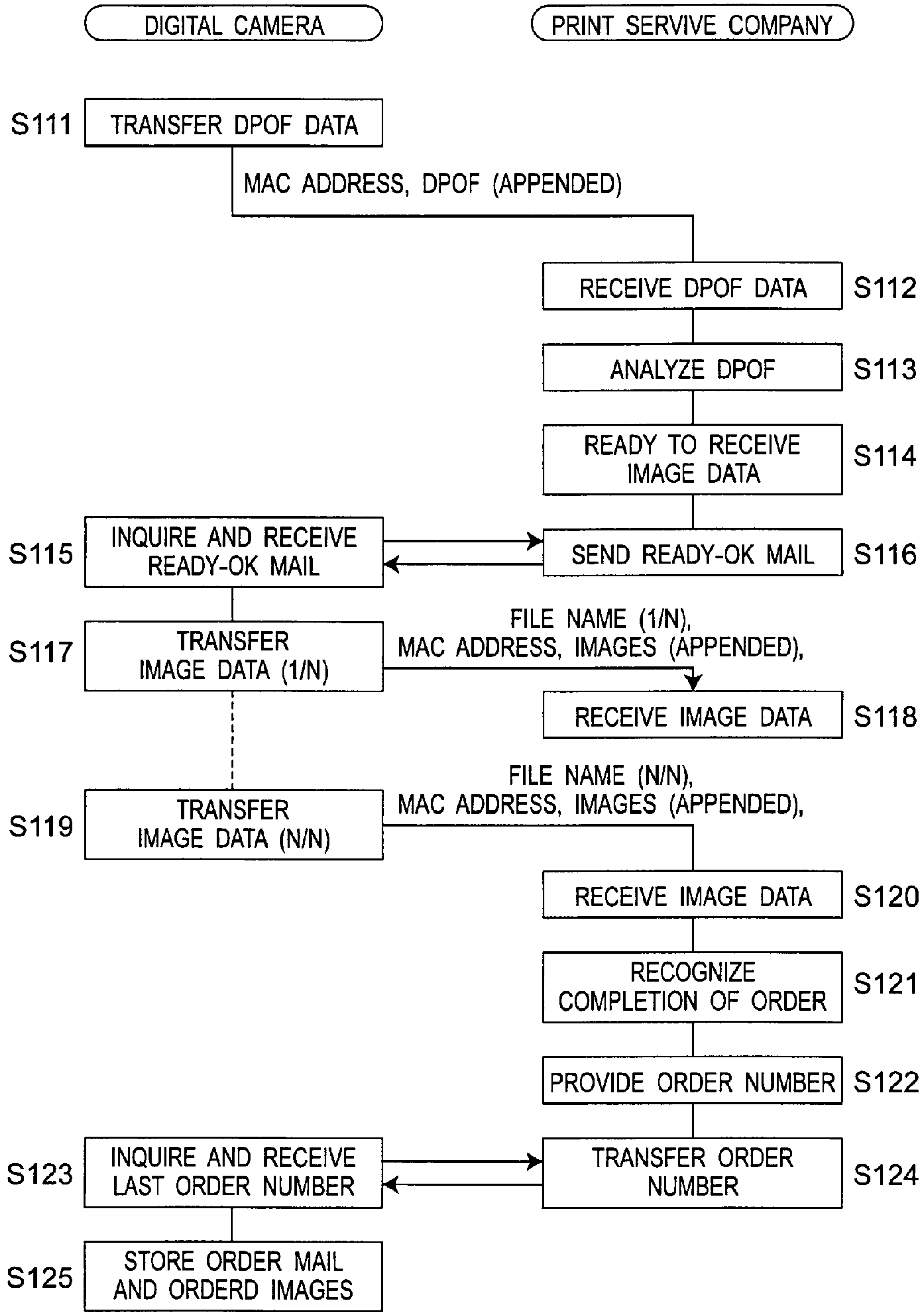
FIG. 23 is a diagram showing a procedure of placing a formal print order to the print service company.

FIG. 23 shows the procedure of placing a formal order to the print service company.

In FIG. 23, when the print order mail is created completely, the digital camera 10 first sends the order mail with an attached DPOF file to the mail server 210 of the print service company (S111). The mail server 210 receives this mail (S112), and analyzes the DPOF file (S113), and judges whether the image to be transmitted can be printed out or not. If possible, the mail server 210 sends a mail ("a ready-OK mail") indicating it is ready to receive image data, to the POP3 server 251 (S114). The digital camera 10 inquires the mail server 210 and receive a ready-OK mail (S115).

In the embodiment, the DPOF file is analyzed when receiving a formal order (see S113), but a similar process is executed also when creating an estimation (see S73 in FIG. 16A), and it appears to be duplicate processing because the analysis result of DPOF file at this time can be utilized. However, if attempted to re-use the analysis result of DPOF file obtained at the time of creating an estimation, the analysis result must be held, resulting in complicate management. For example, if the user does not send a formal print order after creation an estimation, the held analysis result must be erased. But it is hard to determine the timing of erasing. In the embodiment, hence, the DPOF file is newly analyzed when accepting a formal order to simplify the processing.

The digital camera 10 sequentially sends the mails with attached image data (S117, S119), and they are received in the mail server 210 (S118, S120). When the digital camera 10 sends all image data, the mail server 210 recognizes that the order is completed (S121), provides this order with an order number (S122), and adds this event to the progress list 223.

Further, the digital camera 10 inquires the mail server 210 about final order number to acquire it from the mail server 210 (S123, S124). The order mail and image data for the order (resized image) are stored in the memory card 19 of the digital camera 10 (S125). When acquiring the final order number, the time and date of ordering, print content (size, number of copies), and present status may be acquired together. Also the order mail or image data for the order may be stored in the EEPROM 25.

Exchange of information among the digital camera 10, and POP3 server 251 and SMTP server 253 is explained below.

Figure 24:
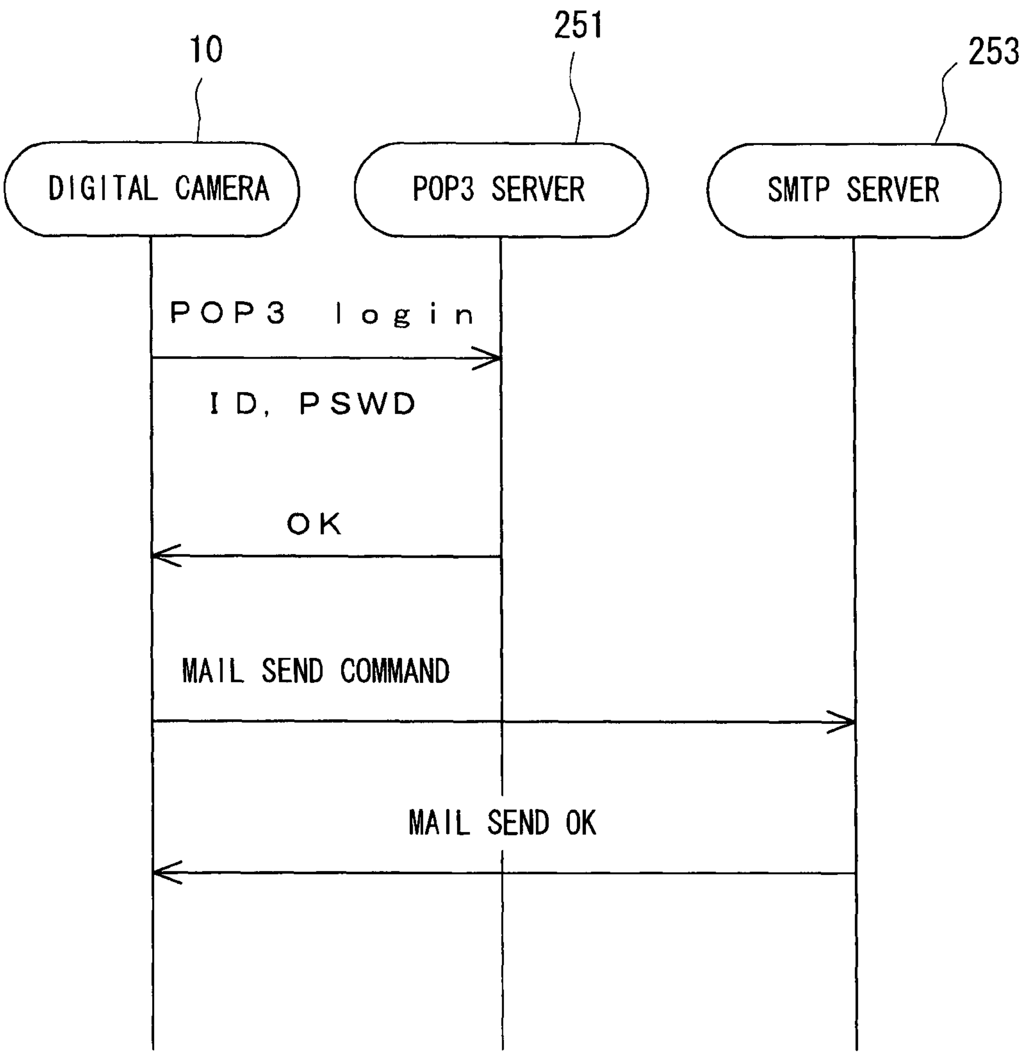
FIG. 24 is an explanatory diagram of exchange of information between the digital camera and the mail server (when sending an electronic mail from the digital camera to the mail server).

Transmission of an electronic mail from the digital camera 10 to the print service company is done in the procedure shown in FIG. 24. First, the device ID and password are sent from the digital camera 10 to the POP3 server 251 for authentication. When the authentication is successful, the mail is sent to the service account of the print service from the digital camera 10 through the SMTP server 253. When the mail transmission is complete, the SMTP server 253 sends a response indicating that transmission is OK to the digital camera 10.

Figure 25:
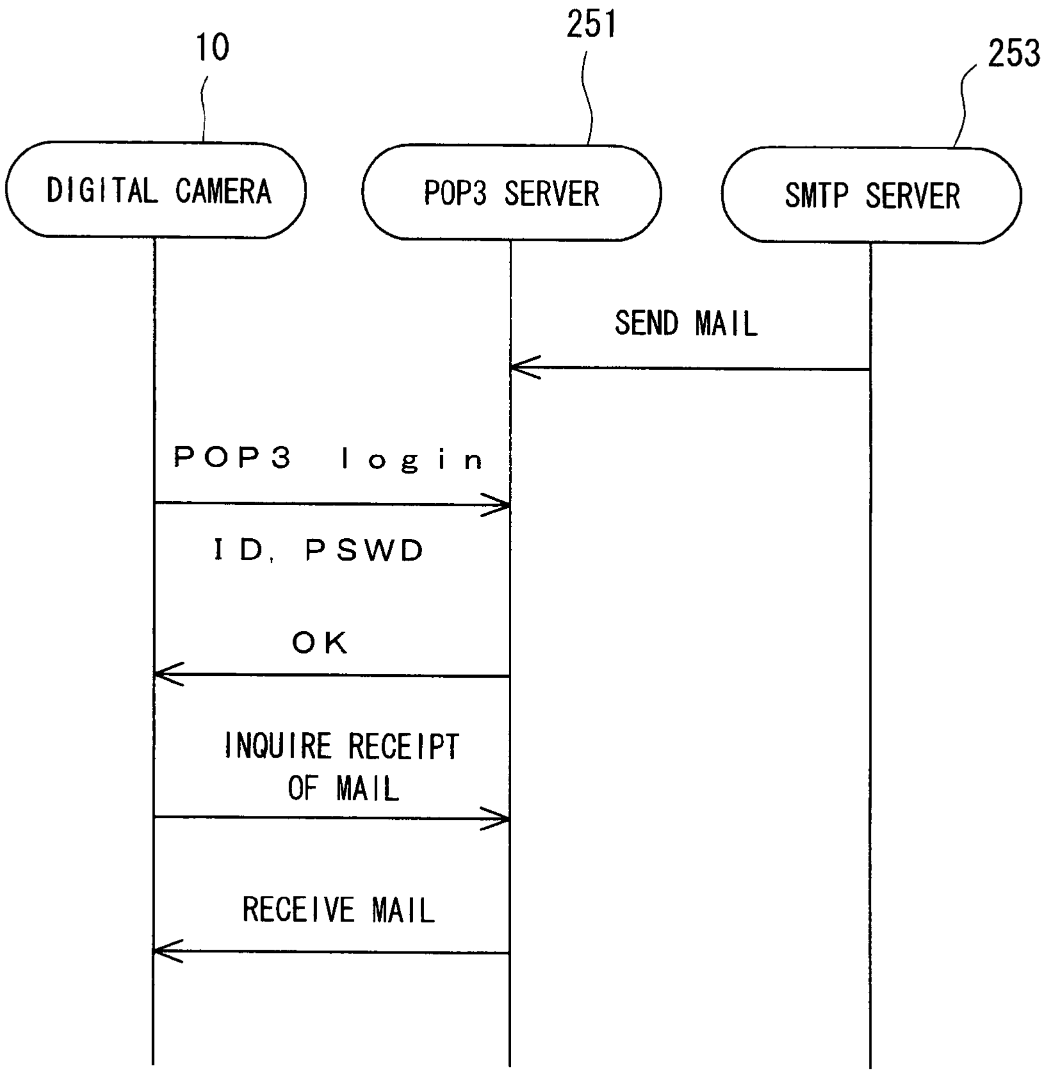
FIG. 25 is an explanatory diagram of exchange of information between the digital camera and the mail server (when inquiring from the digital camera to the mail server).

An inquiry from the digital camera 10 to the print service company is done in the procedure shown in FIG. 25. Information to be transmitted to the digital camera 10 is set in the header section of the mail, and is transmitted to the account of the digital camera 10. At the beginning of the inquiry, the device ID and password are sent from the digital camera 10 to the POP3 server 251 for authentication. When the authentication is successful, the POP3 server 251 is inquired by the digital camera 10 for the reception mail. The digital camera 10 receives the reception mail with the header section recording the information.

At step S111 in FIG. 23, the DPOF file is sent when placing a formal print order, but DPOF file may not be sent at this time. In this case, however, the mail server 210 must store the DPOF file until cancellation is notified or printing is complete. When printing, the DPOF file used at the time of estimation can be used.

At step S123 in FIG. 23, only the final order number is inquired, but all order numbers in a specified storage region of the mail server 210 may be acquired. In this case, the order time is acquired together with the order number from the mail server 210. The digital camera 10 judges the final order number on the basis of the order time.

(4) Summary by Manufacturer (Step S15 in FIG. 6)

In this manner, when acceptance of image print orders from the digital camera 10 to the mail server 210 of the print service company 200 is complete, the mail server 210 sums up the number of ordered prints of each size by manufacturer of digital cameras (S15 in FIG. 6). This sum result is added to the order summary list by manufacturer 225. With reference to the order summary list by manufacturer 225, a rebate can be paid periodically from the print service company 200 to the manufacturers of digital cameras. Summing of number of ordered prints or addition to the order summary list by manufacturer 225 may be done after completion of printout.

(5) Delivery Notice and Delivery Instruction of Prints and Printed Matter (Steps S16 to S19 in FIG. 6)

After summing up by manufacturer, the mail server 210 transmits the DPOF file and the image specified by the file to the printer 270. The printer 270 prints out the image according to the transmitted DPOF file, and produces pictures (S16 in FIG. 6).

The order content is notified from the mail server 210 to the server 281 at the delivery center 280 (S17 in FIG. 6).

Figure 26:
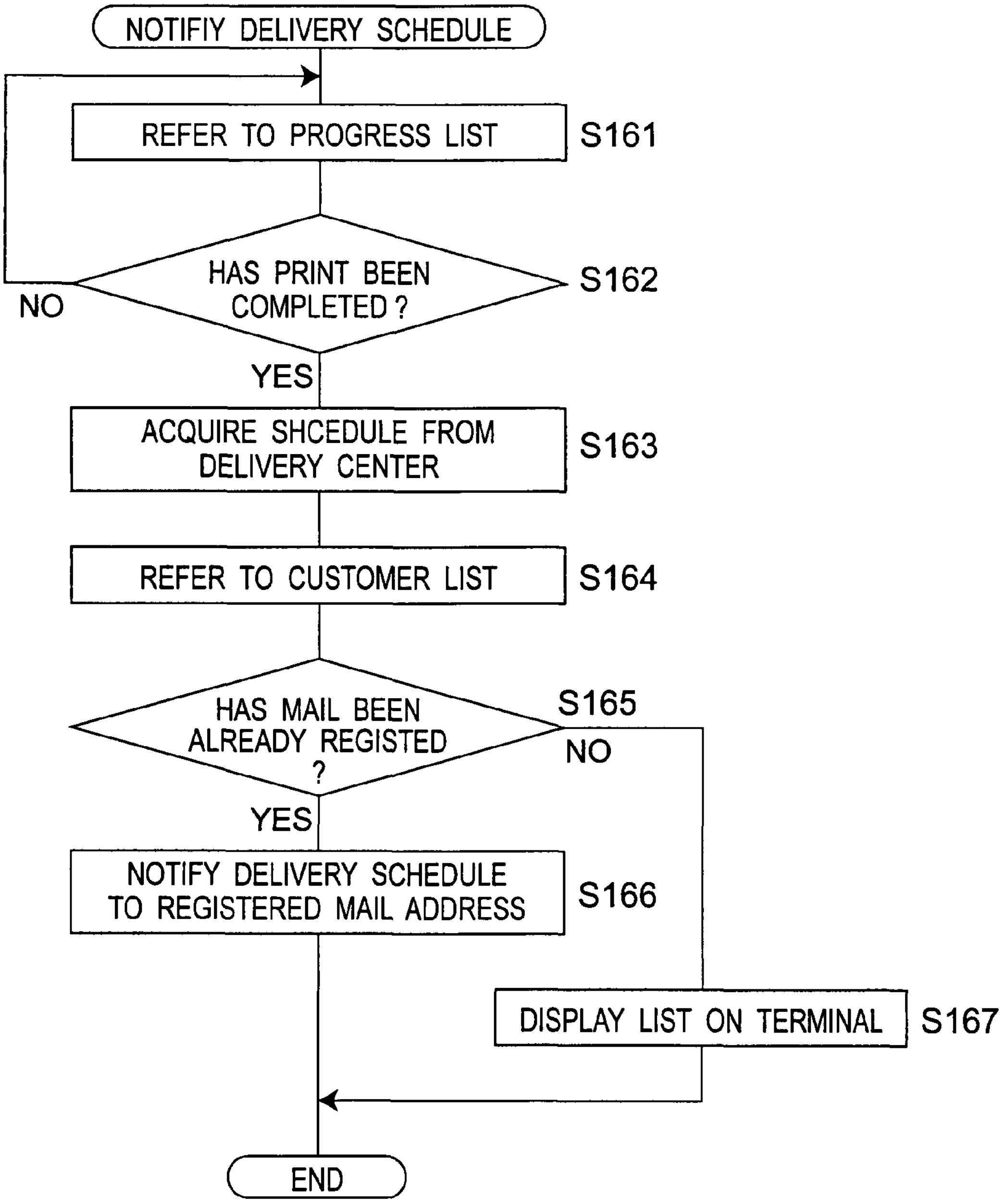
FIG. 26 is a flowchart of notice processing of a delivery schedule.

The mail server 210 notifies the user placing a print order of delivery schedule (S18 in FIG. 6). Notifying process of delivery schedule is specifically described below with reference to the flowchart in FIG. 26.

The mail server 210 refers to the progress list 223 (S161), and judges if the printing process of the order is completed or not, for each order number (S162). When the printing is complete, the delivery schedule for this order number is acquired from the delivery center 280 (S163). Referring next to the customer list 221, the notifying destination of delivery schedule is judged. That is, if the mail address of the notifying destination is registered in the customer list 221 (Yes at S165), the mail notifying the delivery schedule (delivery schedule date, delivery schedule time, delivery method, etc.) is sent to the registered mail address (S166). If the mail address of the notifying destination is not registered in the customer list 221, but the telephone number is registered, the telephone number is displayed on the terminal 260 connected to the mail server 210 (S167). The operator of the terminal 260 calls by referring to the displayed telephone number, and can inform the customer of the delivery schedule. If the telephone number of the notifying destination is registered as a FAX number, the mail server 210 may also notify by FAX. Thus, referring to the customer list 221, the mail server 210 determines the notifying destination of the delivery schedule.

Finally, according to the received order content, the server 281 at the delivery center 280 sorts the printed pictures, and creates delivery instruction information which is information necessary for attaching the address of the delivery destination for the delivery (S19 in FIG. 6). The delivery instruction information includes, for example, delivery destination, name of recipient, and other information. According to this delivery instruction information, the printed matter is finally shipped to the delivery destination designated by the user.

According to the print system of the embodiment, as described herein, printing can be instructed from the digital camera 10 directly to the print service company 200 by electronic mail. At the print service company 200, the printing process can be executed automatically according to the content of the received mail data. At this time, notice of delivery schedule to the user and addressing can be also automated.

From acceptance of the print order (step S14) till the delivery instruction (step S19), the user can refer to the progress list 223 by inquiring the print service company, and obtains the progress status of the work from the mail server 210 of the print service company 200. This inquiry can be made from the digital camera 10 via the Internet 400 or from portable terminal 72. For the inquiry, the order number must be transmitted.

The mail server 210 keeps holding the DPOF file, image information, and order entry information for a specific period after completion of the printing. For this information can be used in subsequent reprint (extra printing) or re-ordering.

(6) Other Processes (6-1) Delivery of Image Data to Third Party

The print system of the present invention also allows the print images ordered to the print service company to be directly transmitted to a third party by electronic mail. This is possible because the order mail and image data for the order are being held in the memory card 19 of the digital camera 10 after acquiring the order number from the mail server 210 (see step S125).

Figure 27:
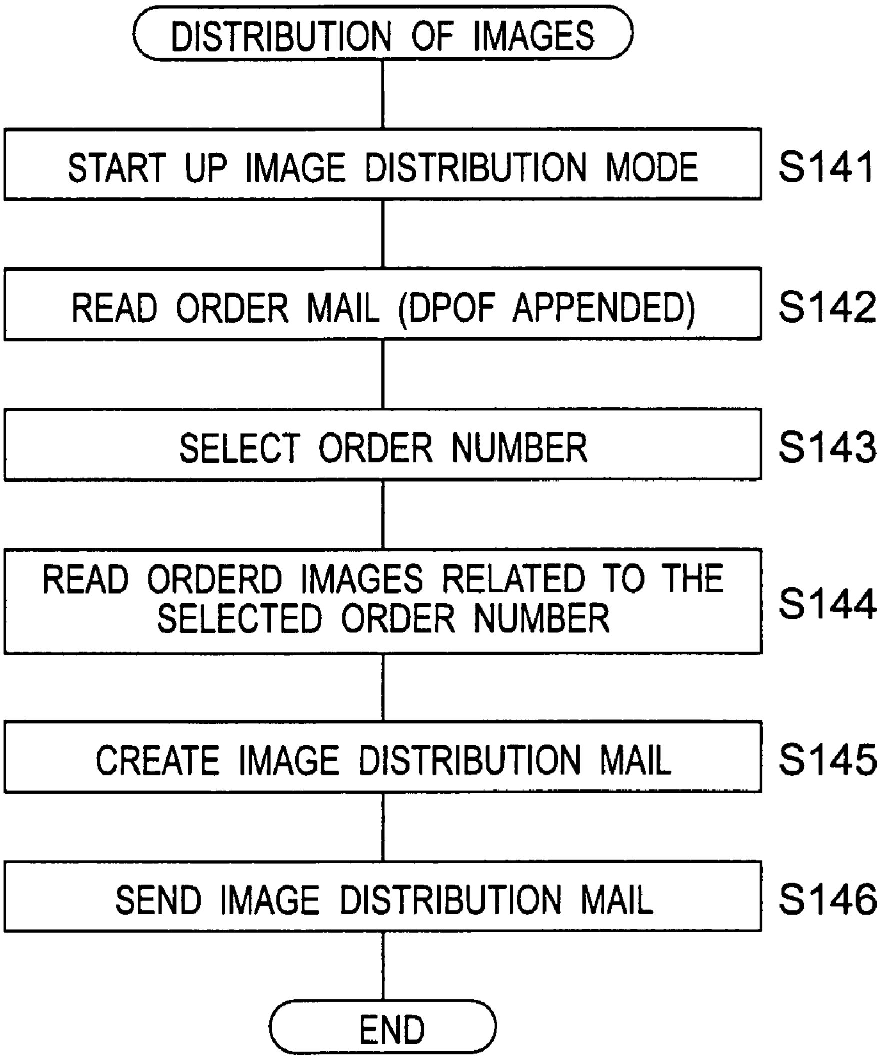
FIG. 27 is a flowchart of an image delivery process to the third party.
Figure 28:
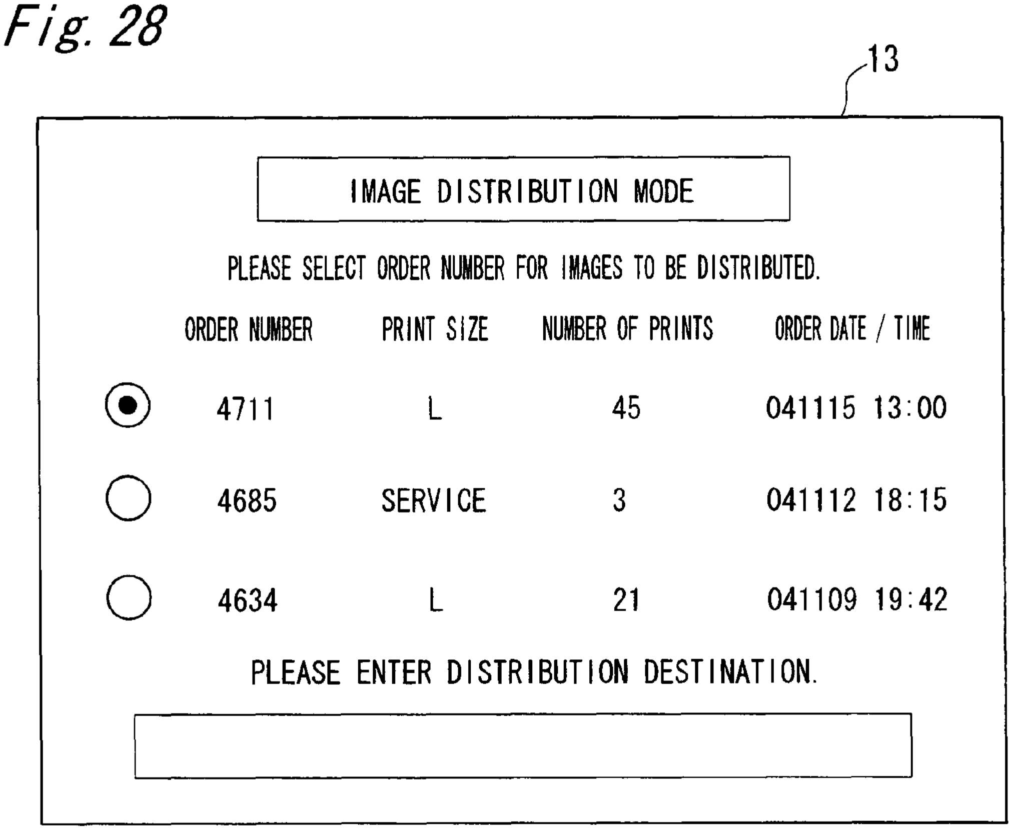
FIG. 28 is a diagram showing a screen displaying information included in an order mail in an image delivery mode.

FIG. 27 is a flowchart of distribution process of image data to the third party. When distributing image data to the third party, the user changes the operation mode of the digital camera 10 to an image delivery mode. When entering into the image delivery mode according to user's operation (S141), the controller 23 reads out the order mail for attaching DPOF (see FIG. 21) held in the memory card 19. The information contained in the order mail being read out is displayed as shown in FIG. 28. On this screen, the order content is displayed by each order number. The screen waits for selection of one order number and input of delivery destination address by the user. When these pieces of information are entered (S143), the order mail for attaching image (see FIG. 22) relating to the selected order number is read out from the memory card 19 (S144). In the read order mail for attaching image, the mail destination ("To") and the subject ("Subject") are changed as indicated by the descriptions B and C in FIG. 29, and an image distribution mail is created (S145). Finally, the image distribution mail is sent (S146).

The reason for changing the subject is as follows. It is first intended to allow the recipient of the image distribution mail to recognize easily the content of the distributed mail. With the subject of the order mail as it is, the general user cannot understand its content. Secondly, the subject of the order mail includes the content of the communication protocol specific to the print service system. Thus, when the subject is used directly, the content of the protocol may be known to the public or may be abused. At the end of the subject, an identifier showing the sequence of file (for example, number 1) is described. It can be generated from the subject of the original order mail for attaching image.

(6-2) Reprint Order

The print system of the embodiment allows reprint (extra printing) after completion of acceptance of the print order. Order for reprint is a method for ordering print by specifying the number of print copies of image which is changed from the once ordered content. In this embodiment, however, the number of print copies cannot be specified in each image, and the number of print copies can be specified only when ordering the number of print copies uniformly in the images. By contrast, in re-ordering explained below, the same content as ordered in the past can be ordered again, in which the number of print copies cannot be changed.

Figure 30:
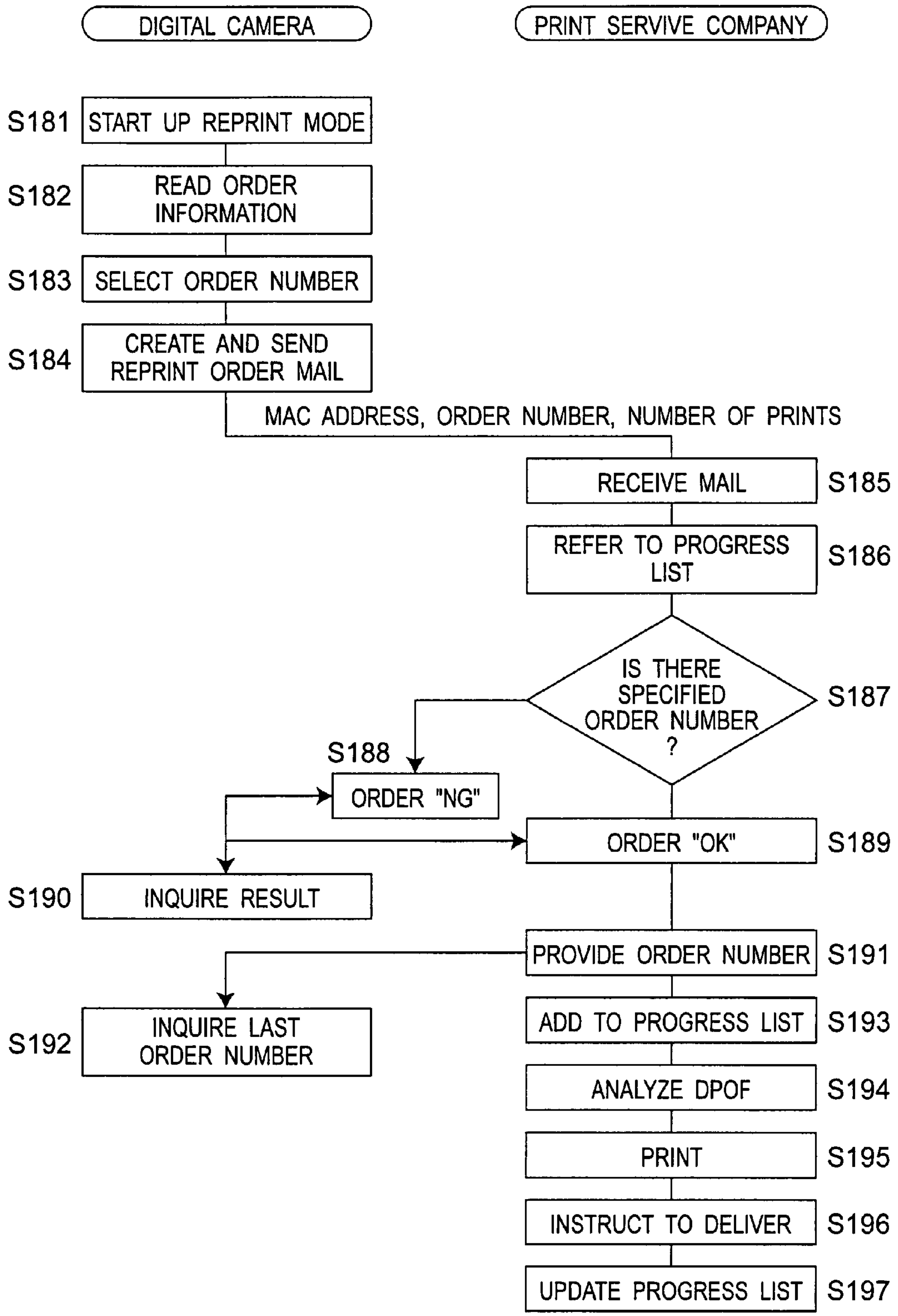
FIG. 30 is an explanatory diagram of processing flow when ordering reprint.
Figure 31:
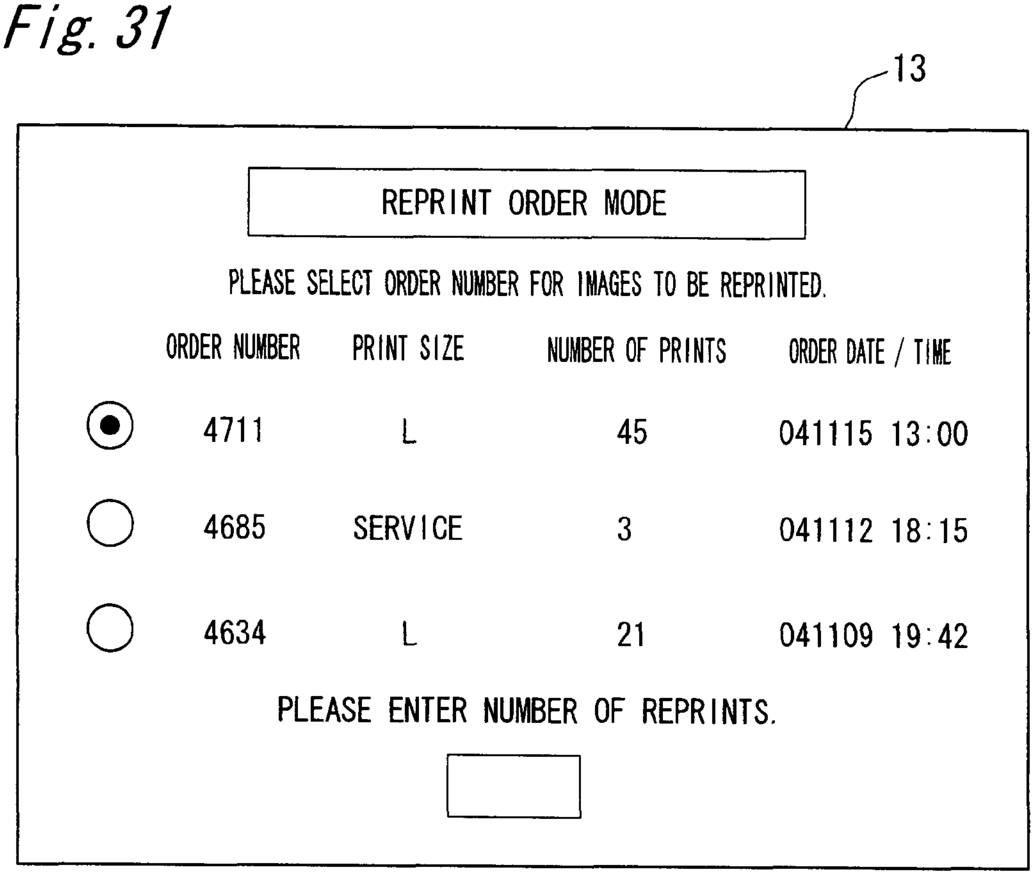
FIG. 31 is a diagram of screen prompting the user to select an order number in a reprint request mode.

FIG. 30 is an explanatory diagram of processing flow of order for reprint. In the case of reprint, the user changes over the operation mode of the digital camera 10 to an reprint mode. When entering into the reprint mode according to user's operation (S181), necessary order information is read out from the order mail stored in the memory card 19 (S182), the screen as shown in FIG. 31 is displayed, and the user is prompted to select an order number. On the screen shown in FIG. 31, when the user selects an order number and designates the number of reprint copies (S183), an reprint order mail is created on the basis of the information, and is sent to the mail server 210 (S184). FIG. 32 shows a description example of reprint order mail. The description C1 of "reprint" is a command for instructing reprint order. The description C2 shows the order number, and the description C3 shows the number of reprint copies which is same for every image.

When receiving a reprint order mail (S185), the mail server 210 refers to the progress list 223 (S186), and judges if the order number specified by the reprint order mail is listed in the progress list 223 or not (S187). If the specified order number is not listed in the progress list 223, the order is determined not to be accepted (S188), and a mail informing it is sent to the mail address of the digital camera 10. The digital camera 10 inquires the mail server 210 about acceptance or rejection of order (S190).

When the specified order number is listed in the progress list 223, the order is determined to be accepted (S189), and a mail informing it is sent to the mail address of the digital camera 10. In succession, an order number is attached to the reprint order (S191), and it is newly added to the progress list 223 (S193). The digital camera 10 inquires the mail server 210 about the newly added order number (S192).

The DPOF file corresponding to the specified order number stored in user data regions 240*a*, 240*b*, . . . of the mail server 210 is read out, and is analyzed to determine the print size, delivery destination and others (S194). On the basis of the analyzed information and content of the reprint order mail, pictures are printed (S195), and the delivery instruction is created (S196). Finally, the progress list 223 is updated (S197). The number of print copies is set to a value specified in the reprint order mail.

In the mail server 210, data stored in the progress list 223 and user data regions 240*a*, 240*b*, . . . are mutually linked and managed as follows. The accepted order information is listed up on the progress list 223 for a specific period after acceptance (for example, one week), and deleted after the specific period. The order mail, DPOF file, and image data relating to the listed orders are held in the user data regions 240*a*, 240*b*, . . . , and these data are erased at the same time when deleted from the progress list 223. By thus managing, the mail server 210 can respond immediately only by referring to the progress list 223 in the event of inquiry about reprint, reordering, canceling, or progress inquiry, and it is not required to scan the user data regions 240*a*, 240*b*, . . . , and thus the management becomes easier. In this example, an order number is held for a specific period, and is erased after the specific period. However the order numbers which pass the specific period may be held as long as the number of them is within a specific quantity. When the number of the order numbers which pass the specific period is over the specific quantity, the order numbers which pass the specific period may be deleted in the order of time from oldest.

In the foregoing explanation, after entering into the reprint mode, the order information is read out from the order mail stored in the memory card 19 (S182). However the stored order information stored in the mail server 210 may be read out from the mail server 210. This arrangement allows the order information no to be stored in the digital camera 10.

(6-3) Reorder

The print system of the embodiment can reorder as well as reprint order. Reorder is, as mentioned above, ordering again in the same content as ordered before, and is different from reprint in that the number of print copies cannot be changed. FIG. 33 shows a description example of a reorder mail. In the reorder mail, as shown in the description C1, the command "reorder" is specified together with the order number (see the description C2). In the reorder mail, it is enough to specify only the past order number, and no data is attached. Hence, the description E indicates no body section and nothing attached.

(6-4) Cancel after Accepting an Order

According to the print system of the embodiment, the user can cancel the order, even after the print order is accepted (step S14), unless the print process (step S16) is started. FIG. 34 shows a description example of a cancel mail which is created and sent by the digital camera 10 when canceling. The command "cancel" is specified (see the description C1) together with the order number to be canceled (see the description C2). When receiving a cancel mail, the mail server 210 describes the date and time of receiving the cancel mail in the field of "cancel date and time" relating to the order number specified in the progress list 223.

According to the print system, information about printing is exchanged via the electronic mail between the information device (for example, digital camera) and order reception server (for example, mail server). Thus, the user can easily send the print request to the print service company, and can utilize the print service easily. Between the information device (for example, digital camera) and order reception server (mail server), only the header section of the electronic mail is used, and no necessary information is written in the body section, and therefore the function about processing of electronic mail to be installed in the information device can be curtailed, and the structure of information device can be simplified.

3. Variations

In the embodiment of the invention, further, the following variations may be considered.

(1) Application to HTTP

Although in the above stated embodiment, SMTP is used as communication protocol between the digital camera 10 and the print service company 200, HTTP may be used instead of SMTP. In this case, in the print service company 200, a WWW server (web server) is used instead of a POP3 server and SMTP server of the mail server 210.

Figure 35:
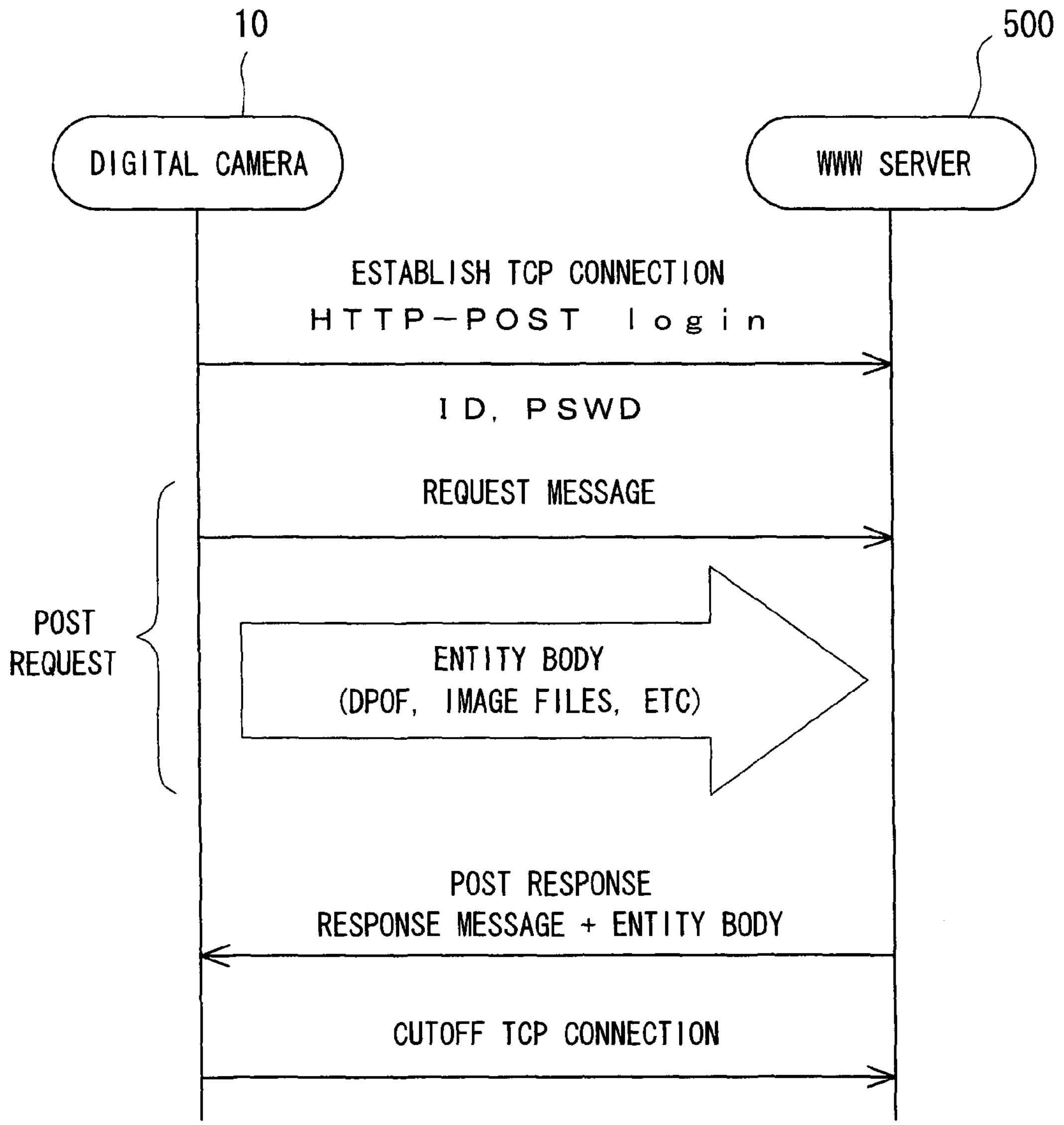
FIG. 35 is a diagram showing exchange of information between the digital camera and WWW server by using HTTP.

FIG. 35 shows exchange of information between the digital camera 10 and the WWW server 500 with HTTP. The digital camera 10 establishes TCP connection with the WWW server 500. After establishment of the TCP connection, when receiving a request message from the digital camera 10, the WWW server 500 confirms the size of entity body with the Content-Length field included in the request message. The digital camera 10 consequently transmits the image data and DPOF file in the entity body. In this transmission, usually, the transmission data is divided and stored into plural packets. After completion of reception of the entity body, the WWW server 500 returns a response. At this time, the WWW server 500 returns also a entity body as one packet together with the response. The entity body in the response includes the estimation amount, delivery schedule date, order number and others, and the data size of the entity body is small. The digital camera 10 cuts off the TCP connection when receiving the response.

FIGS. 36 to 43 show examples of various requests and responses exchanged between the digital camera 10 and the WWW server 500.

Figure 36:
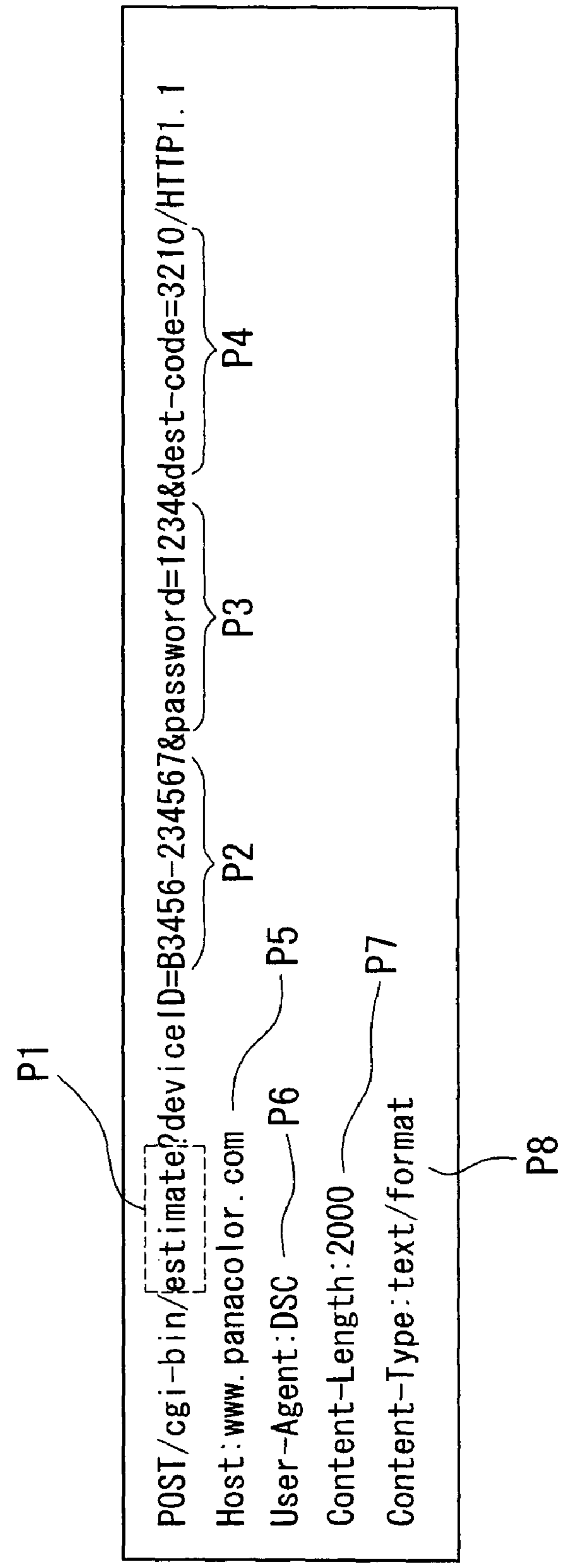
FIG. 36 is a diagram of a description example of POST request sent from the digital camera when requesting an estimation.

FIG. 36 is a description example of POST request transmitted from the digital camera 10 when requesting an estimation. The description P1 of "estimate" is a command for instructing an estimation request. The description P2 of "deviceID= . . . " specifies a device ID, the description P3 of "password= . . . " is a password for authentication, and the description P4 of "dest-code= . . . " specifies a delivery destination code. The description PS of "Host: . . . " specifies the address of the WWW server of the print service company 200. The description P6 of "User-Agent: . . . " shows that the HTTP client is a DSC (digital still camera). Thus, the WWW server recognizes that a request comes from the digital camera, and describes the reply written in a format understood by the digital camera (for example, XML format) in the entity body of POST response. The description P7 of "Content-Length: . . . " specifies byte length of the entity body. For an estimation request, the byte length of the DPOF file is specified in it. The description P8 of "Content-Type: . . . " specifies a data type of the entity body. For an estimation request, the data type of the DPOF file is specified in it.

FIG. 37 is a description example of POST response returned to the digital camera 10 when returning an estimation. FIG. 37A shows content of a response message, and FIG. 37B shows the content of the entity body. In FIG. 37A, the description Q1 specifies data type of the entity body. Herein, the data type is specified to be XML format. Since the digital camera cannot interpret HTML data, the entity body is described in XML format in the response. The description Q2 specifies byte length of the entity body. In FIG. 37B, the description Q3 indicates an estimation amount, the description Q4 is number of print copies, and the description Q5 indicates delivery schedule date.

Figure 38:
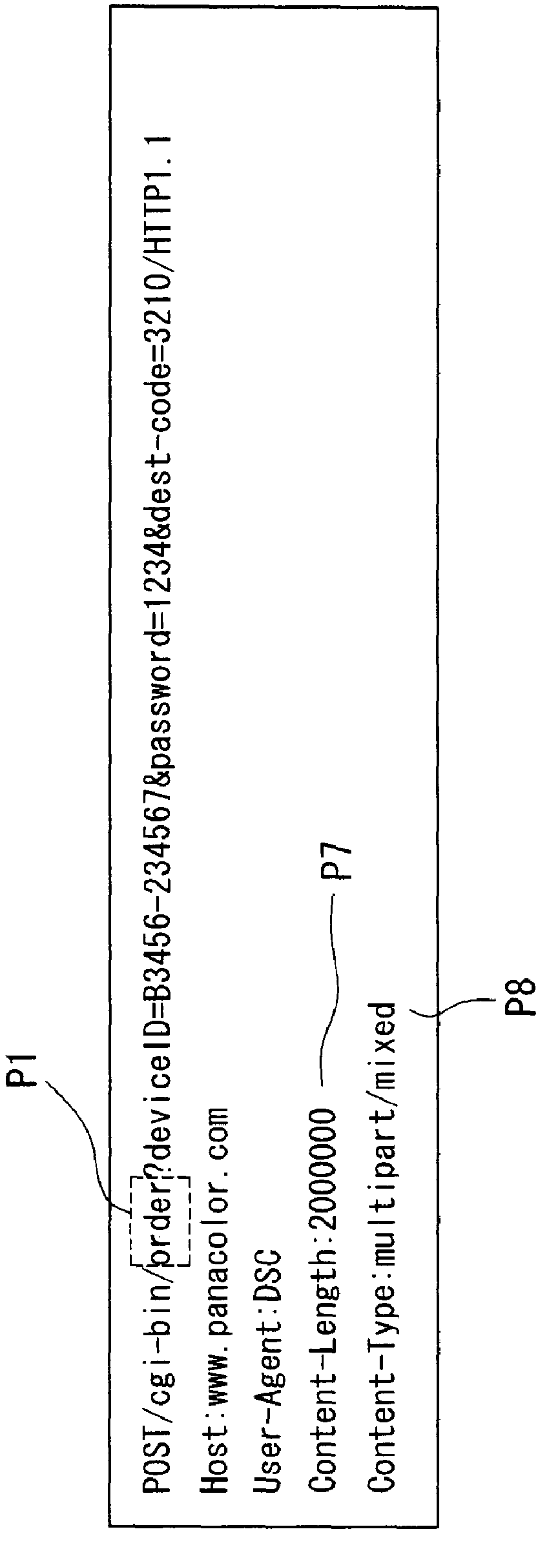
FIG. 38 is a diagram of a description example of POST request sent from the digital camera when placing a formal print order.

FIG. 38 is a description example of a POST request sent from the digital camera 10 when placing a formal order. The description P1 of "order" is a command for instructing a formal order. The description P7 of "Content-Length: . . . " specifies a total byte length of DPOF file and image data in the formal order. The description P8 of "Content-Type: . . . " is specified as "multipart" in the case of formal order in which the DPOF file and image data are transmitted together.

In the foregoing example, when placing a formal order, the order number is applied to the digital camera 10 (see step S122 in FIG. 23), but the order number may be applied to the estimation request, and the order number may be returned in the response to the estimation request. In this case, the POST response is, for example, as shown in FIG. 39B. The order number is specified in the description Q6. The order number is a unique number assigned in each estimation by the WWW server 500 of the print service company 200. Afterwards, the order number applied on the estimation can be used for placing a formal order.

Figure 40:
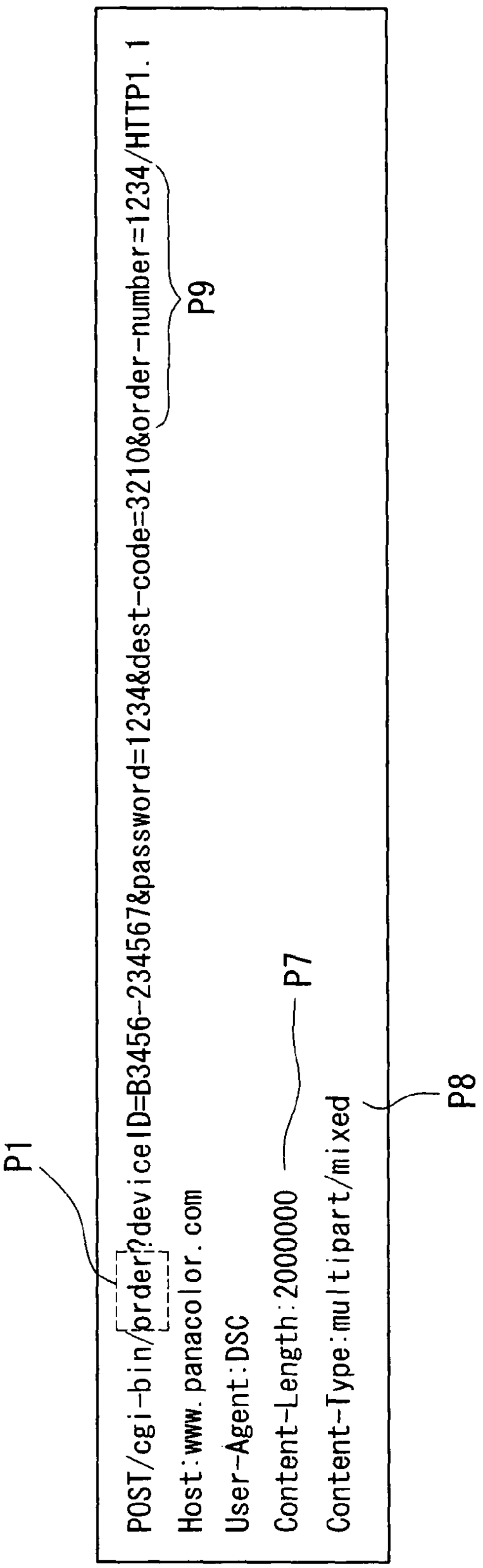
FIG. 40 is a diagram of an estimation in description example of POST request sent from the digital camera when placing a formal print order (when order number is added when returning).

FIG. 40 is a description example of a POST request transmitted from the digital camera 10 when placing a formal order with the order number. The order number applied on estimation is specified in the description P9. The WWW server 500 receiving the POST request of this formal order creates a POST response for notifying completion of acceptance of the order with the order number ("order-number") stored in the entity body, and transmits it to the digital camera 10.

Figure 41:
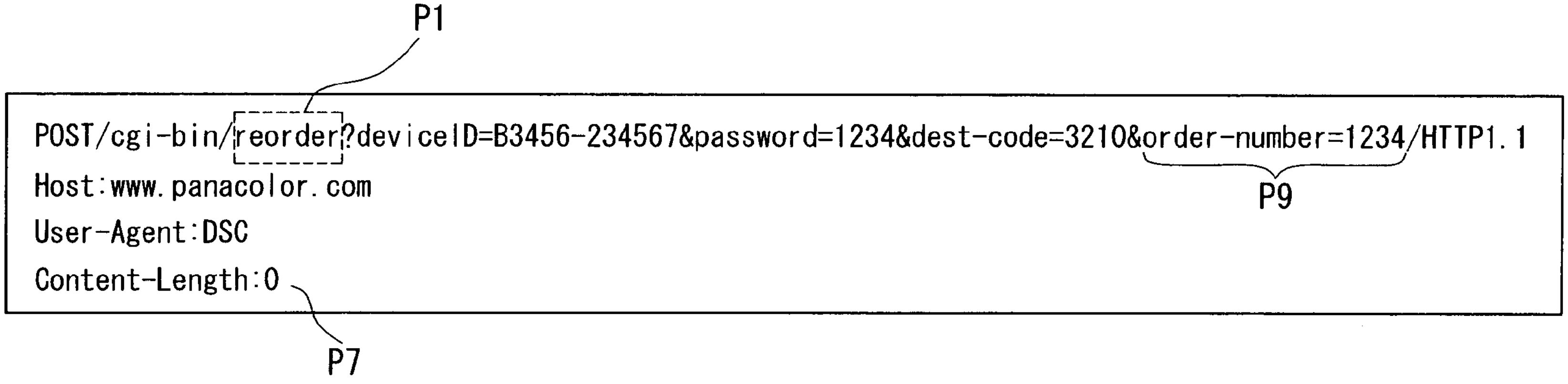
FIG. 41 is a diagram of description example of POST request sent from the digital camera when re-ordering.

FIG. 41 is a description example of a POST request transmitted from the digital camera 10 when re-ordering. The description P1 of "reorder" is a command for instructing re-ordering. The description P7 of "Content-Length: . . . " is zero because there is no entity body for re-ordering. The description P9 of "order-number= . . . " specifies the order number for re-ordering.

Figure 42:
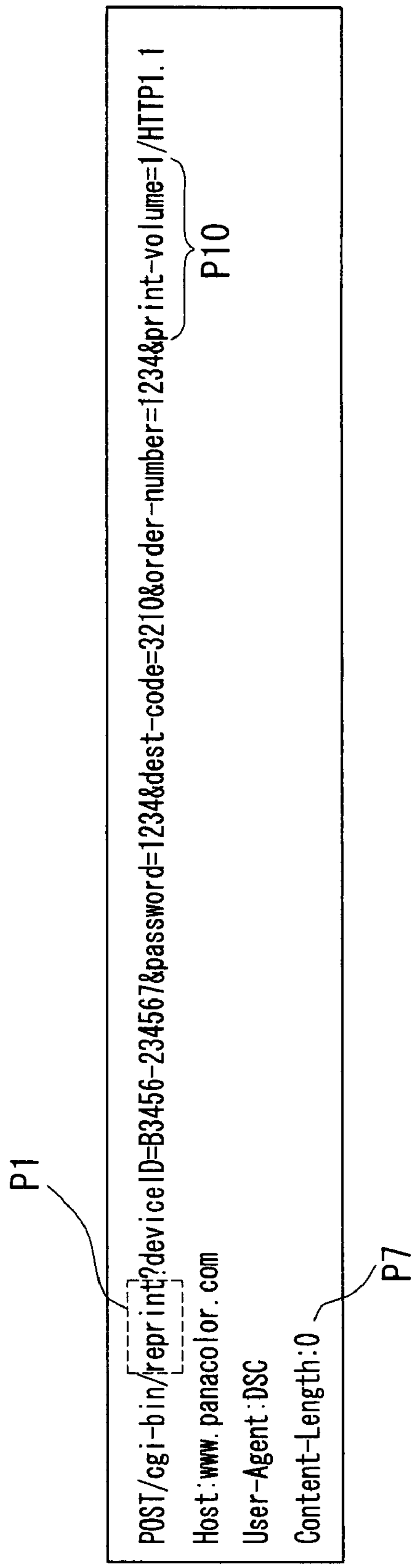
FIG. 42 is a diagram of description example of POST request sent from the digital camera when ordering reprint.

FIG. 42 is a description example of a POST request transmitted from the digital camera 10 when ordering reprint. The description P1 of "reprint" is a command for instructing an order for reprint. The description P7 of "Content-Length: . . . " is zero because there is no entity body for reprint order. The description P10 of "print-volume= . . . " specifies the number of reprint copies.

Figure 43:
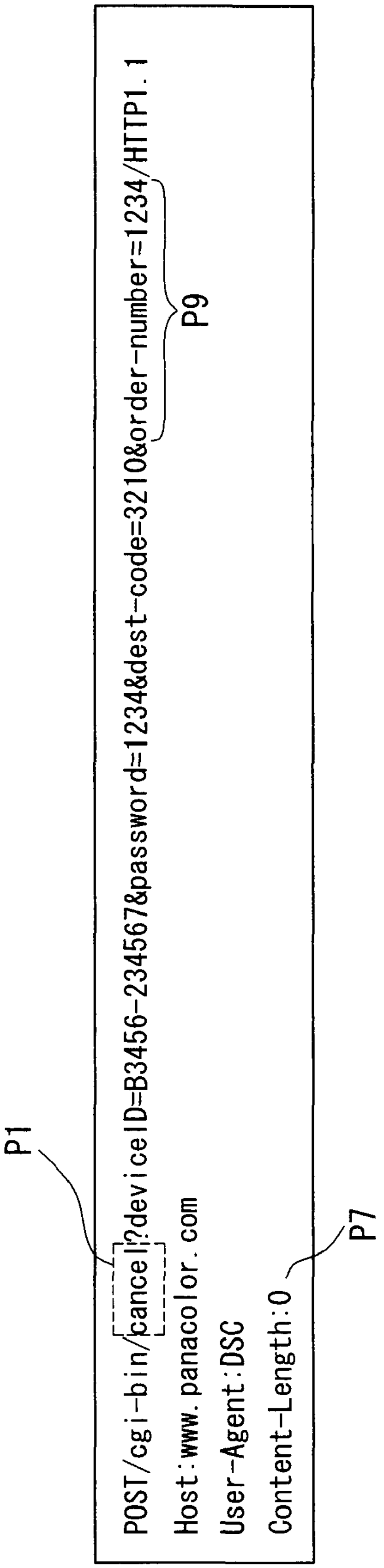
FIG. 43 is a diagram of description example of POST request sent from the digital camera when canceling

When realizing the print service system by using HTTP, too, same as in the case of realizing the print service system by using SMTP, after placing a formal order, the formal order can be canceled by using the digital camera 10. FIG. 43 shows the POST request for canceling which is transmitted from the digital camera 10 to the WWW server 500 in this case. A cancel command is specified in the description P1.

In the examples in FIG. 35 to FIG. 43, the POST request is issued from the digital camera 10 to the server 500, but GET request may be issued instead. That is, GET request may be issued while specifying information to be acquired (file name including estimation and progress status) so as to acquire desired information from the server 500.

Thus, the digital camera 10 works as a client in http protocol, and issuance of POST request or GET request allows necessary information to be obtained from the server 500.

(2) User registration is entered with the digital camera 10, but a personal computer may be also used for the registration. Alternatively the user may be registered off-line with a postcard.

(3) The digital camera 10 transmits both device ID and MAC address. However only the MAC address may be transmitted, omitting the device ID. In this case, the MAC address is used as the ID.

(4) The foregoing explanation describes an example in which one DPOF file specifies print information for a plurality of images. However one DPOF file may be created for one image to be printed.

(5) In the print system, instead of the digital camera, other type of information device may be used, if it can store the image, create print information (DPOF file), and create, transmit and receive an electronic mail.

Embodiment 2

Figure 44:
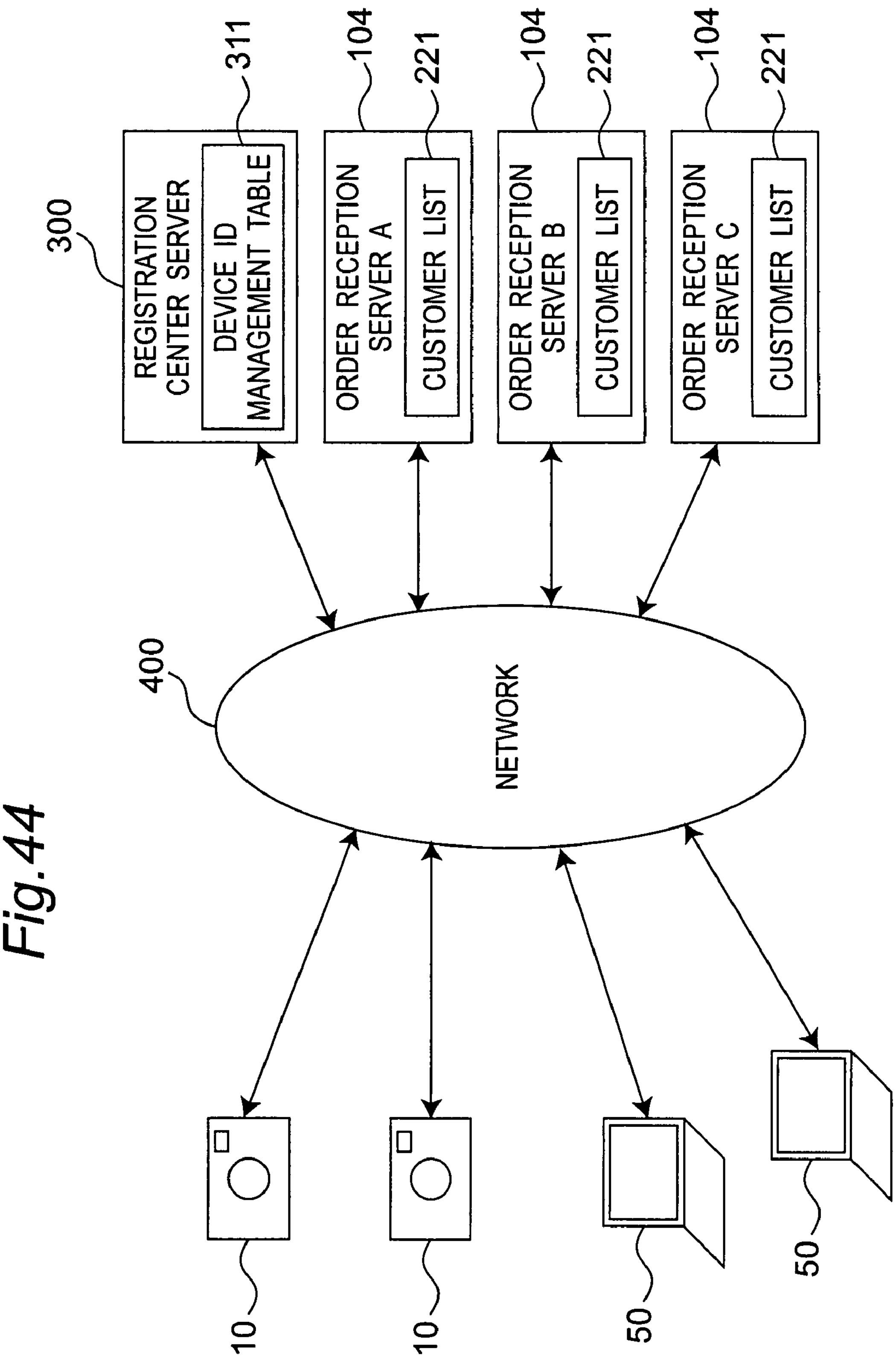
FIG. 44 is a diagram of a configuration of a print system in Embodiment 2 of the invention.

Other embodiment of the print system of the present invention is described. FIG. 44 shows a network configuration of a print system in Embodiment 2. In this embodiment, a registration center server 300 is newly installed for managing an order reception server 104 which is registered for each digital camera 10. The order reception server 104, in the embodiment corresponds to the mail server 210 in Embodiment 1.

The digital camera 10, registration center server 300, and order reception server 104 are connected through the network 400. The network is connected to an information processing device 50 such as a personal computer (PC) for providing various settings to the servers 104 and 300.

The registration center server 300 has basically the same configuration as the mail server shown in FIG. 3. The registration center server 300 returns URL (Uniform Resource Locator) of the order reception server corresponding to the digital camera 10, that is, the address on the network, in reply to an inquiry from the digital camera 10. For this purpose, the registration center server 300 stores a device ID management table 311. The device ID management table 311 is a table for managing the order reception server to which the individual digital camera 10 transmits a print request. Specifically, as shown in FIG. 45, it manages the device ID assigned to each digital camera 10 and URL of the order reception server while associating the device ID with the URL. URLs of one or plural order reception servers are related to one device ID. Each order reception server 104 stores the customer list 221, the progress list 223, or the like, same as in Embodiment 1. The customer list 221 or the like may be managed unitarily in the registration center server 300.

Figure 46A:
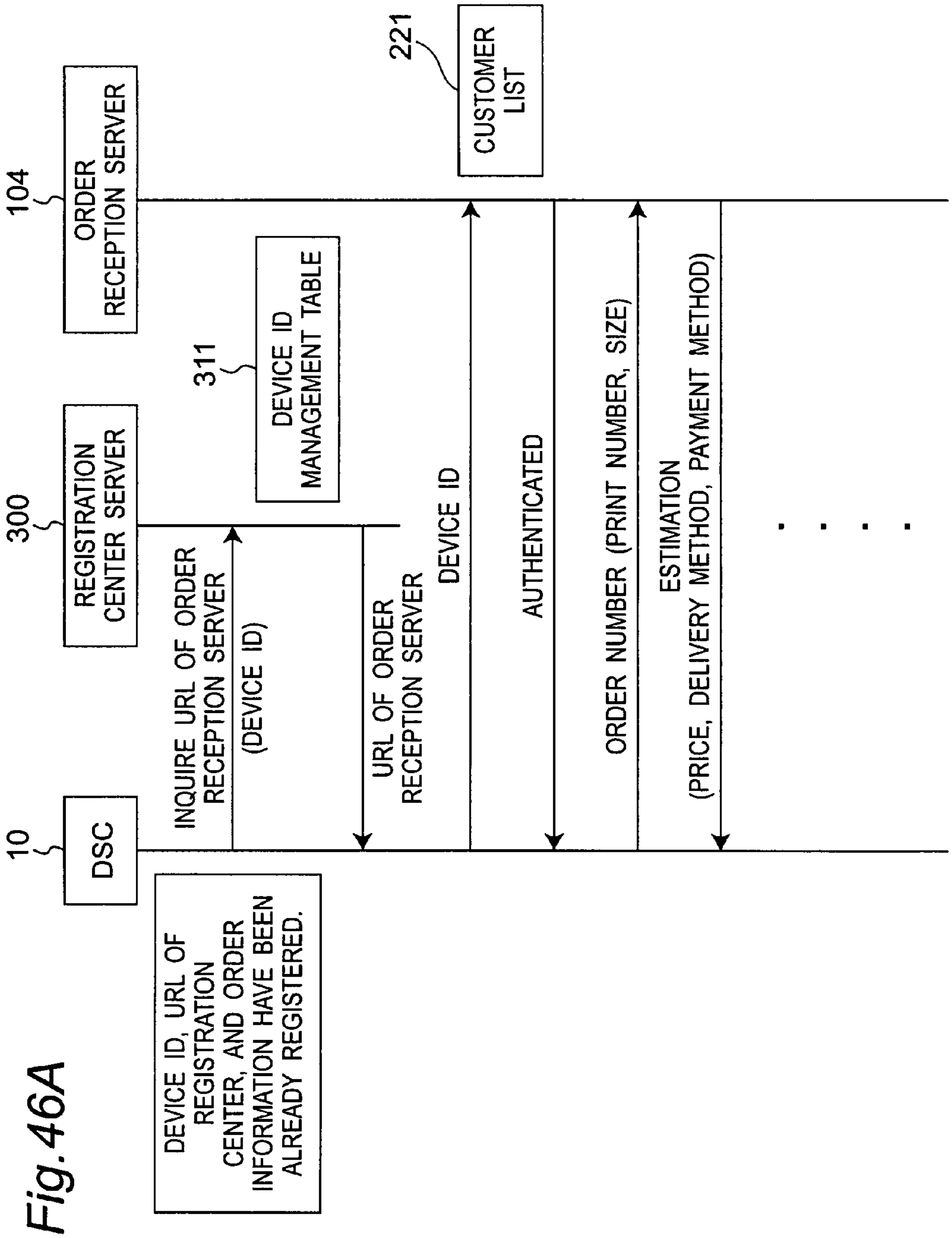
FIG. 46A is a diagram of procedure of placing a print order in print system in Embodiment 2.

Referring to FIG. 46A, operation of the print system is explained. When the digital camera 10 is connected to the network 400, it is checked if the user has been already registered or not (see S51 and S52 in FIG. 9). If not registered yet, the user is registered (detail of this process is describe later).

Then, accessing the registration center server 300, the device ID of the digital camera 10 is notified, and the URL of the order reception server 104 registered for the digital camera 10 is inquired. The registration center server 300 refers to the device ID management table 311, acquires the URL of the order reception server corresponding to the notified device ID to return it to the digital camera 10. The digital camera 10 transmits the order information and others to the order reception server 104 of the acquired URL. In the device ID management table 311, when URLs of plural order reception servers are related to one device ID, the registration center server 300 transmits plural URLs. In this case, the user can select one URL on the digital camera 10. Thus, the registration center server 300 refers to the device ID management table 311 in reply to the inquiry from the digital camera 10, and specifies at least one order reception server 104 which can receive the print order from the digital camera 10. Then the registration center server 300 transmits URL of the specified order reception server 104 to the digital camera 10. The subsequent process is same as explained in Embodiment 1.

The order reception server 104, after confirming authentication of the digital camera 10 (this authentication checking is called "authentication confirmation session"), receives the order information from the digital camera 10 (this order information receiving operation is called "order session") . In this case the both sessions must be related with each other. For example, in order to realize communication between the digital camera 10 and order reception server 104 in CGI method of HTTP, the authentication confirmation session and the order session can be related with each other with Cookie or the like. Alternatively, in order to realize communication between the digital camera 10 and the order reception server 104 in SOAP method of HTTP, the authentication confirmation session and order session can be related with each other by storing the session ID in SOAP.

Thus, in the embodiment, the digital camera 10 accesses the registration center server 300 to acquire information of order reception server 104 registered for the digital camera 10. Since the registration center server 300 is inquired about the URL of the order reception server 104, the digital camera 10 is not required to be installed with various URLs of order reception servers possibly different in each digital camera, but the digital camera 10 is sufficient to be installed with only the URL of the registration center server 300.

Figure 46B:
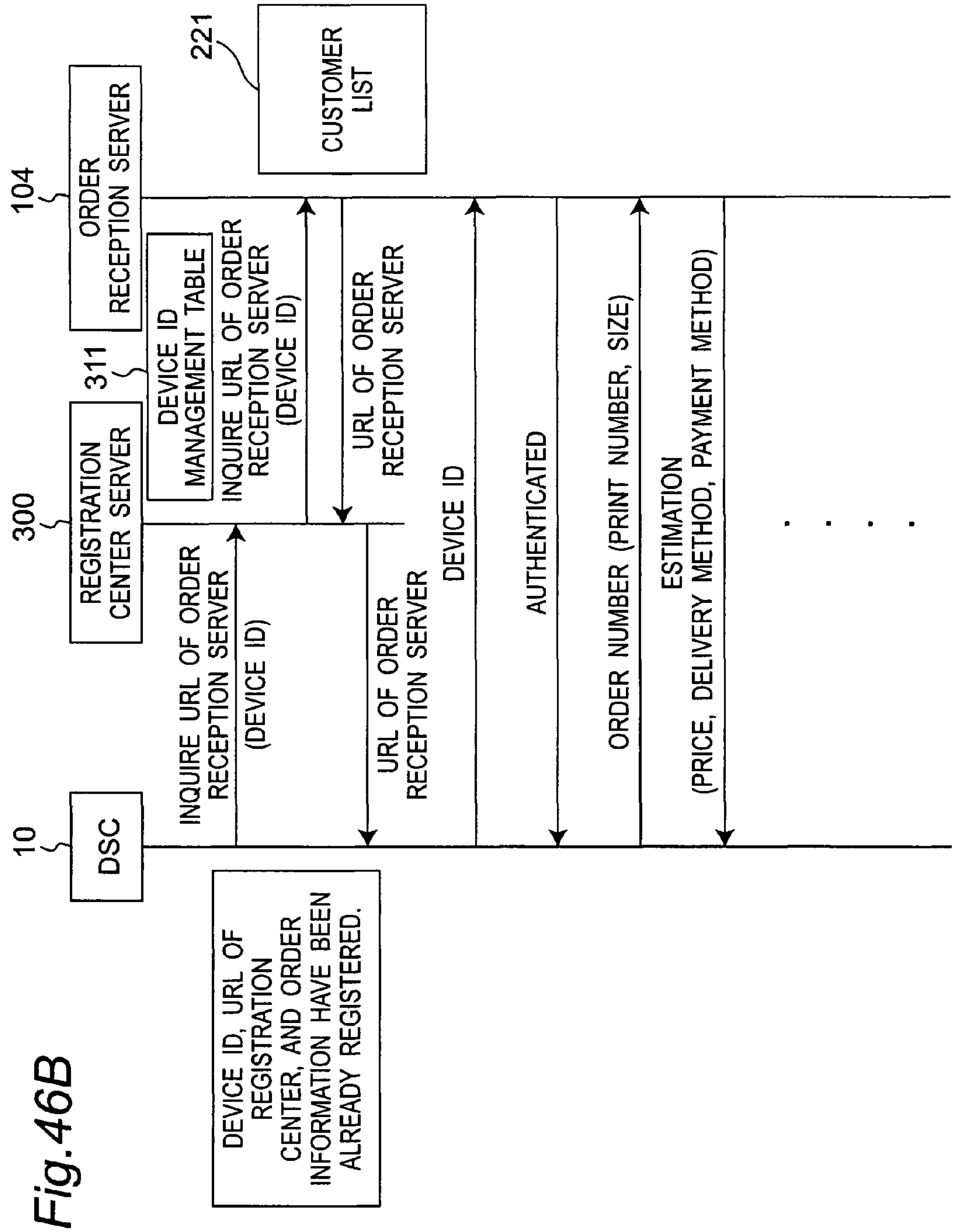
FIG. 46B is a diagram showing the other example of procedure of placing a print order in a print system in Embodiment 2.

FIG. 46B is an explanatory diagram of other example of operation of the registration center server 300. In this example, when receiving an inquiry about URL of the order reception server 104 from the digital camera 10, the registration center server 300 refers to the device ID management table 311 to decide an order reception server 104 corresponding to the device ID, transmits the device ID to the order reception server 104, and checks if the device ID has been registered or not. When the device ID has been already registered, the order reception server 104 returns the URL of the order reception server 104 to the registration center server 300. If not registered, the order reception server 104 returns an error response. The registration center server 300, when receiving a URL from the order reception server 104, notifies the digital camera 10 of it. On the other hand, when receiving no URL from the order reception server 104 because of absence of order reception server or unregistered device ID, the registration center server 300 returns an error response to the digital camera 10.

Thus, when inquired from the digital camera 10, the registration center server 300 may inquire the order reception server 104 about URL. This method makes it possible to confirm a status in which there is no order reception server or a status in which no device ID is registered in the order reception server 104. Thus, even if the content of the device ID management table 311 does not match with the actual status, notice of wrong URL to the digital camera 10 can be prevented.

The digital camera 10, may access the registration center server 300 and acquire the URL of the order reception server 104 every time connected to the network. However, in the embodiment, the digital camera 10 is so arranged to preliminarily accesses the registration center server 300 to acquire the URL of the order reception server when requesting an estimation or when acquiring an estimation, and then access the order reception server by using the acquired URL in at least one of the subsequent processes (for example, formal order, cancel, re-order, reprint, and so on). More specifically, when requesting an estimation or when acquiring an estimation, the digital camera 10 acquires the URL of the order reception server from the registration center server 300, and stores it relating it to the order number. In at least one of the subsequent processes (for example, formal order, cancel, re-order, reprint, and so on), it communicates with the order reception server by using the stored URL. If not requesting an estimation, URL of the order reception server received when placing a formal order or when receiving a response to the formal order may be stored.

Figure 47:
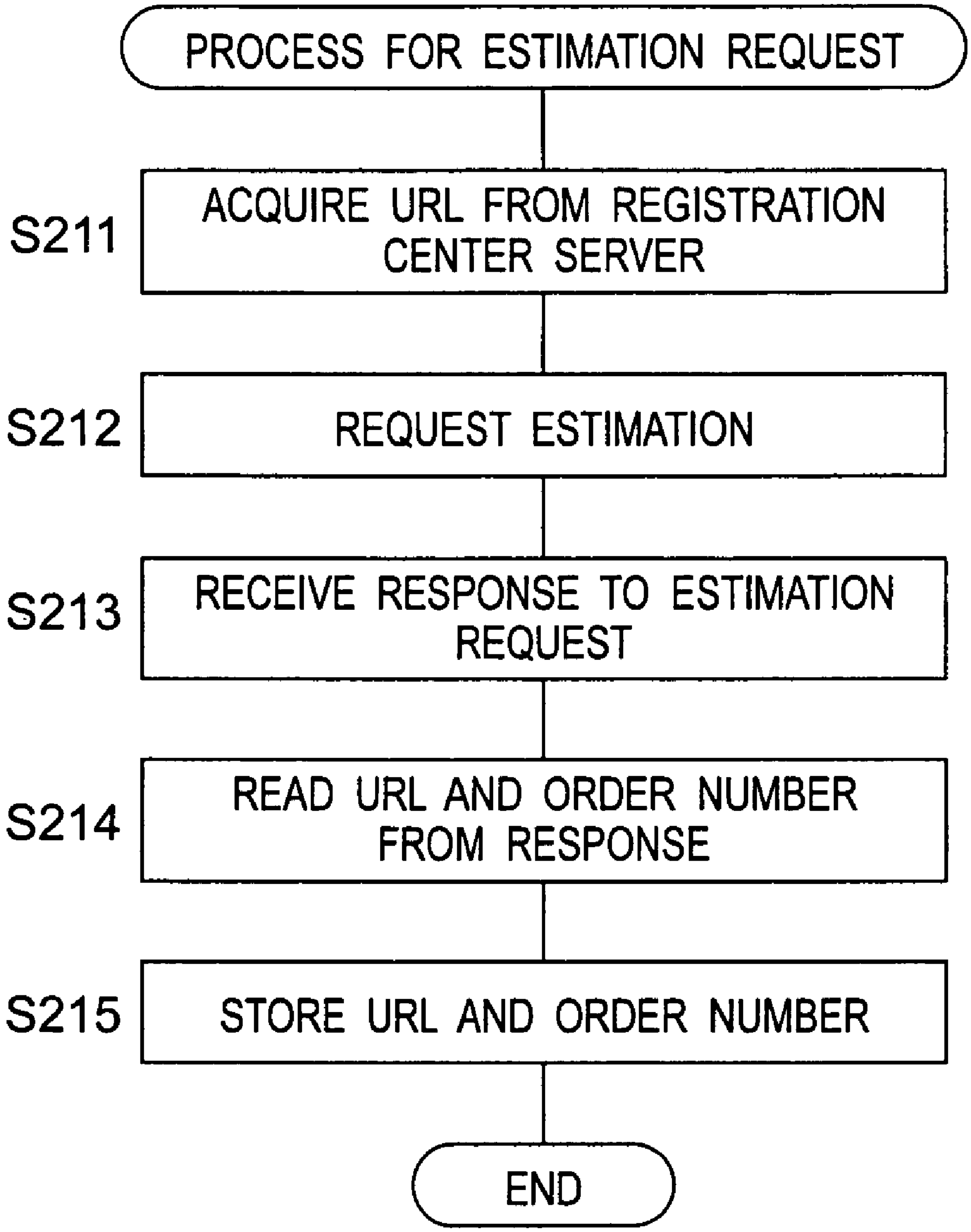
FIG. 47 is a flowchart of estimation requesting process when storing URL in relation to order number.

FIG. 47 shows an example of process for the above estimation request. First, the digital camera 10 accesses the registration center server 300, and acquires the URL of the corresponding order reception server 104 (S211). Accessing the order reception server 104 by using the acquired URL, an estimation is requested (S212). A response to the estimation request (see FIG. 37) is received from the order reception server 104 (S213). At this time, the order number corresponding to the estimation request is included in the response, and the URL (Q7) of the order reception server 104 and order number (Q6) are extracted from the response (S214). The extracted URL (Q7) of the order reception server 104 and order number (Q6) are related with each other, and stored in a specified storage region in the digital camera 10 (RAM 23, memory card 19, and so on) (S215). The reason for extracting the URL to be stored from the response is to obtain the latest URL of the order reception server.

Figure 48:
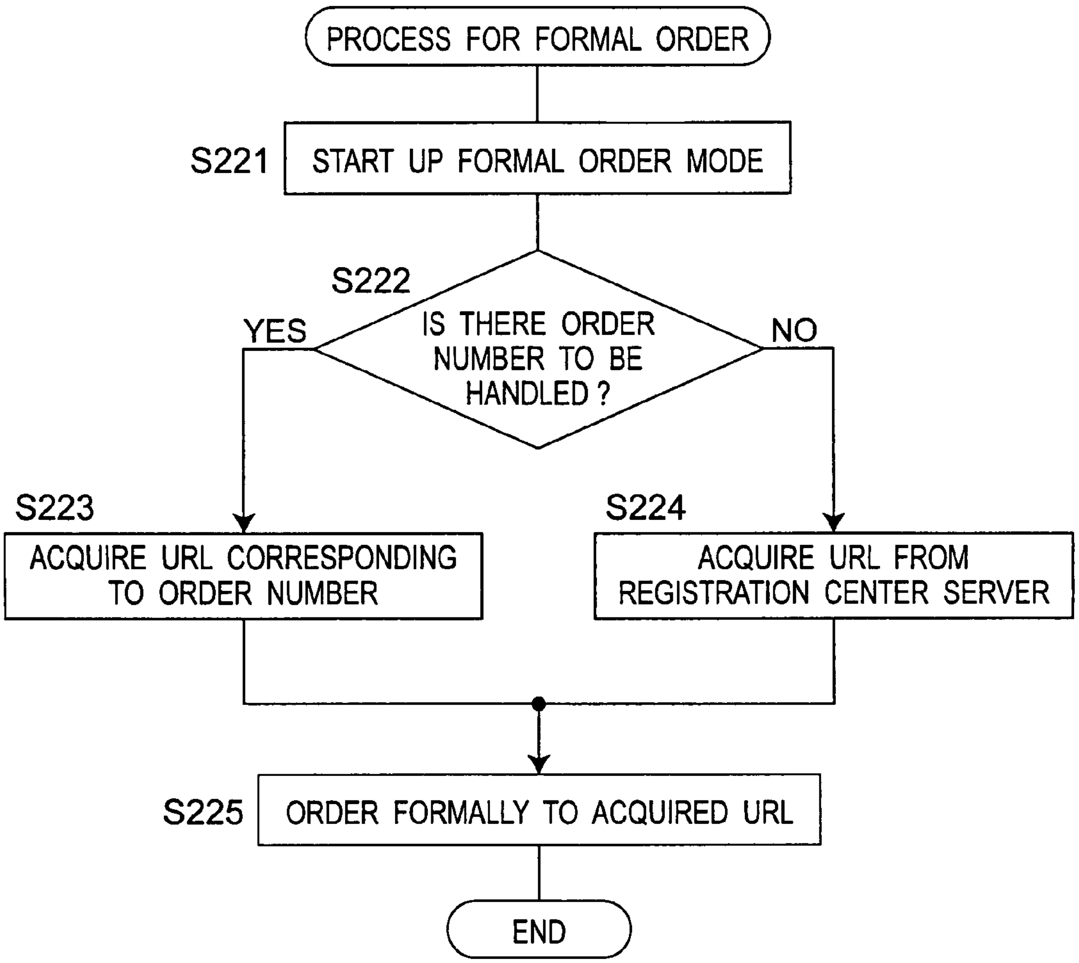
FIG. 48 is a flowchart of a formal order placing process by using stored URL and order number.

FIG. 48 shows an example of process for placing a formal order after storage of URL of the order reception server 104 and order number. In the digital camera 10, when the user instructs a process of placing a formal order (S221), the order number stored in relation to the URL of order reception server 104 is detected (S222). If a stored order number is found, the URL in relation to the number is read out (S223). A formal order is placed with the read URL and the order number (S225). On the other hand, if the stored order number is not found (when a formal order is placed directly, for example, without requesting an estimation), the registration center server 300 is inquired about URL (S224), and a formal order is placed to the order reception server of the acquired URL (S225).

In short, it is so arranged to relate information specifying a process (request) with URL of the order reception server making the process (request), store them, and communicate with the order reception server by using the stored URL when executing at least one of the subsequent processes relating to the process (request). As a result, in at least one of the subsequent processes (for example, cancel, re-order, reprint), the step of inquiring the registration center server 300 about URL can be omitted. The URL stored in the digital camera 10 is erased in a specified period after completion of formal order placing. Thus, for a specified period after completion of formal order placing, re-order or reprint can be requested with the stored URL.

Figure 49:
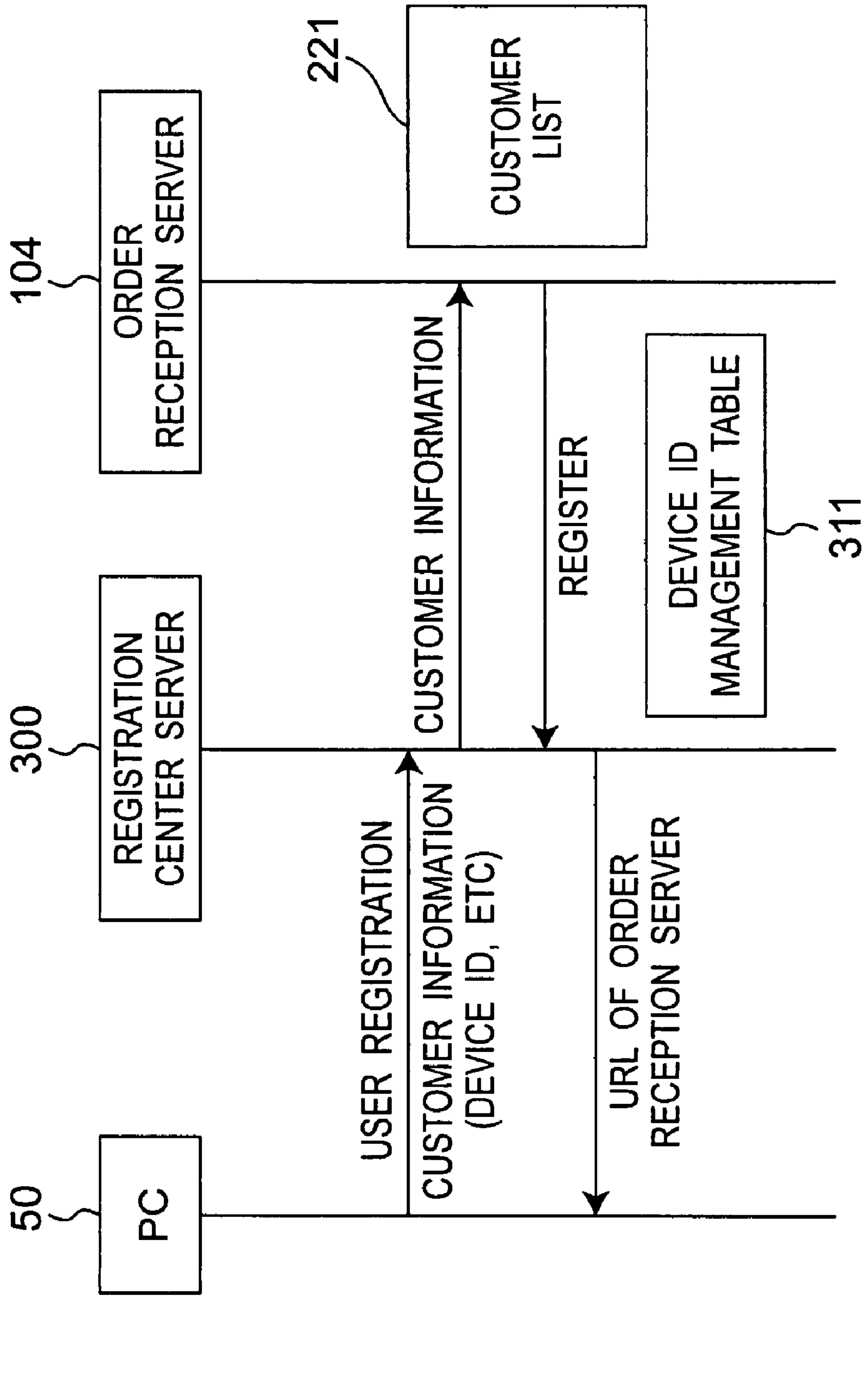
FIG. 49 is a diagram of procedure of user registration process in print system in Embodiment 2.

Referring to FIG. 49, the user registration process in the embodiment is explained. The user registration process in the embodiment is executed by the registration center server 300 and by the information processing device 50 connected to the network 400. The information processing device 50 has a user registration processing program.

When the user registration processing program of the information processing device 50 is started up, a user registration screen is displayed same as the screen shown in FIG. 8. On this screen, the user enters necessary items, including the device ID, MAC address, password, credit card number for payment, delivery destination information of printed matter (delivery destination 1, delivery destination 2, delivery destination 3), user's mail address for communication with the user, telephone number, customer name, and recipient name.

The user registration information such as delivery destination entered by the user is encrypted with public key system or secret key system. The encrypted user registration information is transmitted to the registration center server 300 over the network 400.

The registration center server 300 decrypts the received user registration information, updates the device ID management table 311 on the basis of the decrypted information, and transmits the user registration information to the order reception server 104. The order reception server 104 adds the received user registration information to the customer list 221. When addition to customer list 221 is successful, the order reception server 104 informs the user of completion of registration through the registration center server 300.

The registration center server 300 may update the device ID management table 311 managed in the registration center server 300 periodically or irregularly by referring to the customer list 221 or progress list 223 managed in the order reception server 104. For example, when the customer list 221 or progress list 223 in the order reception server 104 is directly updated by the user, the registration center server 300 may update the device ID management table (by new addition, change or deletion) so as to keep matching with the latest information.

In this method, the user registration process is executed by way of the registration center server 300.

In Embodiments 1 and 2, communication between the digital camera and servers is realized in CGI method, but it may be also realized in SOAP method. The CGI method is a method of requesting server process with the server process program and its input arguments described in a HTTP request line, while the SOAP method is a method of requesting server process with the server process content and its input arguments described in not a HTTP request line but a HTTP entity body. In the case of SOAP method, the server process content and its input arguments are described in XML.

The digital camera 10 may acquire the URL from the registration center server 300 in at least one of a process for an estimation request and a process for a formal order.

The customer list 221, progress list 223, summary list by manufacturer 225, and delivery destination list 227 may be stored as being properly distributed in the registration center server 300 and order reception server 104, and the functions of the mail server 210 and delivery center server 281 may be properly distributed between the registration center server 300 and order reception server 104.

Embodiment 3

As shown in FIG. 1, the digital camera 10 is connected to the network 400 through a router 80. At this time, the digital camera 10 communicates in conformity with specified LAN standard (for example, IEEE802.3). This embodiment explains a configuration in which the digital camera 10 is connected to the router 80 (or network) through an external device.

Figure 50:
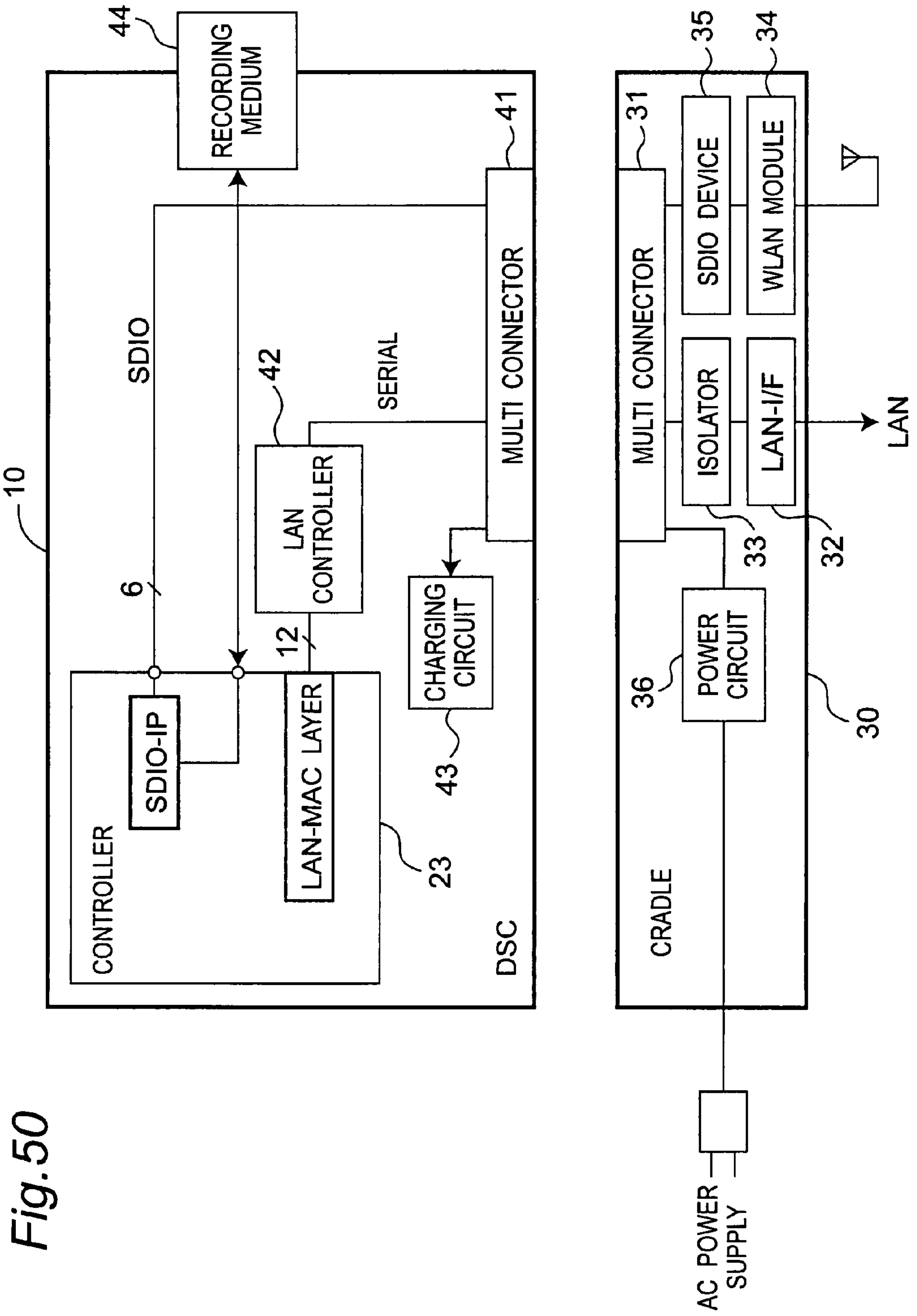
FIG. 50 is a diagram of a configuration of a digital camera and a cradle in embodiment 3 of the invention.

As shown in FIG. 50, the digital camera 10 is connected to the router 80 (or network) by way of a cradle 30. The cradle 30 is a device for connecting the digital camera 30 to the router 80 (or network) by wired or wireless means.

The cradle 30 has a multiconnector 31 for communicating data with the digital camera 10 and a power source circuit 36. The cradle 30 includes a LAN interface unit 32 as a physical connection unit (modular jack) for connecting a LAN cable, and an isolator 33 for electrically isolating between the multiconnector 31 and LAN interface unit 32, as an arrangement for communication with wired LAN standard (IEEE802.3, etc.). The cradle 30 further includes a wireless LAN module 34, and a SDIO device 35 as an interface device of SDIO standard, as an arrangement for communication with wireless LAN standard (IEEE802.11, etc.).

The digital camera 10 includes a multiconnector 41 for connecting with the multiconnector 31 of the cradle 30, a LAN controller 42, and a charging circuit 43. The charging circuit 43 charges the digital camera with a power source supplied from the power source circuit 36 of the cradle 30. The LAN controller 42 converts a digital signal from the controller 23 into an analog serial signal in conformity with the LAN standard (for example, IEEE802.3, etc.). Such an analog serial conversion can reduce the number of signal wires, that is, the number of pins of the multiconnector 41 used in wired LAN.

The digital camera 10 stores image data in a recording medium 44. In this example, the recording medium 44 is an SD memory card. The controller 23 of the digital camera 10 has a function of controlling the SDIO device originally. Hence, even if the SDIO device 35 for connecting the wireless LAN module 34 is provided in the cradle 30, the controller 23 can be used as a controller for controlling the wireless LAN module 34, the cradle 30 does not need another controller for controlling the wireless LAN module 34.

Thus, according to the configuration of the embodiment, the digital camera 10 is reduced in size by providing the wired LAN interface (modular jack) 32 and wireless LAN module 34 at the cradle 30 side. Further, conversion of a digital signal to an analog serial signal by the LAN controller 42 can reduce the number of pins in the multiconnectors 41 and 31 for connecting between the WLAN digital camera 10 and the cradle 30. Moreover, the controller for controlling the LAN communication is provided at the digital camera 10 side, the configuration of cradle 30 is simplified, and its manufacturing cost is suppressed.

The digital camera 10 and the cradle 30 may be designed to conform to either wired LAN or wireless LAN only.

The invention is applicable to a print system capable of accepting a print request through a network.

The invention claimed is:

1. A print system configured to process a print order of image data through a network, comprising:

an information device for storing image data; and an order reception server connected to the information device through a network, wherein before placing a formal print order, the information device transmits instruction information for creating an estimate and print information for specifying print content to the order reception server which is configured in communication with the information device, while sending no image data to be printed, the order reception server creates the estimate based on the received print information, and transmits the estimate to the information device, and the information device which received the estimate transmits image data to be printed to the order reception server when placing a formal print order.

2. A print system configured to process a print order of image data through a network, comprising:

an information device for storing image data; and an order reception server connected to the information device through a network, wherein before placing a formal print order, the information device transmits instruction information for creating an estimate and print information for specifying print content to the order reception server which is configured in communication with the information device, the order reception server creates the estimate based on the received print information, and transmits the estimate to the information device, the information device which received the estimate does not transmit print information for specifying print content when placing a formal print order, and the order reception server uses the print information for specifying print content which is received at the time of receiving the instruction information, as print information for a printing process.

3. A print system configured to process a print order of image data through a network, comprising:

an information device for storing image data; and an order reception server connected to the information device through a network, wherein before placing a formal print order, the information device transmits instruction information for creating an estimate and print information for specifying print content to the order reception server which is established in communication with the information device, the order reception server creates the estimate based on the received print information, and transmits the estimate to the information device, and the information device which received the estimate automatically performs a process for placing a formal print order, when the process for placing a formal print order is not canceled within a specified time after receiving the estimate.

4. The print system according to claim 3, wherein the information device is configured to preset a condition for automatically performing the process for placing the formal print order, and in case that content of the estimate satisfies the preset condition, the information device automatically performs the process for placing the formal print order when the process for placing the formal print order is not canceled within a specified time after receiving the estimate.

* * * * *